(12) United States Patent
Hamamatsu et al.

(10) Patent No.: US 6,941,195 B2
(45) Date of Patent: Sep. 6, 2005

(54) METHOD AND DEVICE FOR ALLOCATING THRUST

(75) Inventors: Masanori Hamamatsu, Hyogo (JP); Yukinobu Kohno, Hyogo (JP); Masaaki Higashi, Hyogo (JP); Kenichi Nakashima, Hyogo (JP); Yasuo Saito, Osaka (JP); Hiroshi Ohnishi, Kobe (JP)

(73) Assignees: Kawasaki Jukogyo Kabushiki Kaisha, Kobe (JP); Kabushiki Kaisha Kawasaki Zosen, Kobe (JP)

( * ) Notice: Subject to any disclaimer, the term of this patent is extended or adjusted under 35 U.S.C. 154(b) by 30 days.

(21) Appl. No.: 10/440,759

(22) Filed: May 19, 2003

(65) Prior Publication Data

US 2004/0004135 A1 Jan. 8, 2004

(30) Foreign Application Priority Data

May 20, 2002 (JP) ........................................ 2002-144980
May 14, 2003 (JP) ........................................ 2003-136436

(51) Int. Cl.$^7$ ....................... B63H 25/52; G01M 15/00; G06F 15/20
(52) U.S. Cl. ............................ 701/21; 244/60; 701/11; 73/117.4; 114/144 E; 239/265.19; 440/38
(58) Field of Search ........................... 701/21; 73/117.4; 244/60, 75 R; 239/265.19; 440/38; B63H 25/42, 21/22, 25/02, 25/04

(56) References Cited

U.S. PATENT DOCUMENTS

| | | | |
|---|---|---|---|
| 4,074,648 A | * | 2/1978 | Reid et al. ............ 114/144 RE |
| 4,532,877 A | * | 8/1985 | Nagata et al. ........... 114/144 E |
| 4,537,066 A | * | 8/1985 | Simpson ..................... 73/117.4 |
| 5,006,993 A | * | 4/1991 | Virnig et al. ................. 701/99 |
| 5,456,429 A | * | 10/1995 | Mayersak ................. 244/76 J |
| 5,631,830 A | * | 5/1997 | Schroeder ..................... 701/4 |
| 5,657,948 A | * | 8/1997 | Roucoux ................... 244/3.22 |
| RE37,331 E | * | 8/2001 | Schroeder ..................... 701/4 |
| 6,347,763 B1 | * | 2/2002 | Harkins et al. ............ 244/3.21 |
| 6,695,251 B2 | * | 2/2004 | Rodden et al. ............ 244/3.21 |
| 2003/0131583 A1 | * | 7/2003 | Kudija et al. .............. 60/203.1 |
| 2003/0173469 A1 | * | 9/2003 | Kudija et al. ............... 244/172 |
| 2004/0004135 A1 | * | 1/2004 | Hamamatsu et al. ... 239/265.19 |

FOREIGN PATENT DOCUMENTS

| | | |
|---|---|---|
| EP | 0 129 287 A1 | 12/1984 |
| EP | 0 778 196 A1 | 6/1997 |
| EP | 0 907 117 A1 | 4/1999 |

(Continued)

OTHER PUBLICATIONS

Unknown, System enables safe landings with total failure of normal flight controls, from http://www.findarticles.com/, published on Sep. 13, 2004.*
Unknown, New on–board engine lifts Hughes–built satellites to final orbit, Business Wire, Jun. 13, 2000.*
Unknown, Near earth asteroid rendezvous (NEAR) Press Kit, National Aeronautics and Space Administration, Feb. 1996.*
Robert Kunzig, Europe's dream—explosion of Ariane 5 rocket, May 1997 (from http://www.findarticles.com/.*
European Search Report for EP 03 01 1401 dated Sep. 3, 2003.

*Primary Examiner*—Cuong Nguyen
(74) *Attorney, Agent, or Firm*—Marshall, Gerstein & Borun LLP

(57) ABSTRACT

Force balance and moment balance associated with thrust of air and water craft equipped with thrust generators are preset in view of non-linear characteristics and dynamic characteristics of thrust generators. A performance index for minimizing thrusts generated by the thrust generators is defined. Using the balance as restricting condition, propeller thrusts of the thrust generators and rudder angles and changing speeds of rudders that minimize the performance index are calculated.

18 Claims, 34 Drawing Sheets

FOREIGN PATENT DOCUMENTS

| | | | | |
|---|---|---|---|---|
| EP | 1364870 A1 | * | 11/2003 | ........... B63H/25/46 |
| GB | 2123777 B | * | 10/1985 | ........... B63H/21/22 |
| GB | 2124406 B | * | 10/1985 | ........... B63H/25/00 |
| JP | 01-311997 | | 12/1989 | |
| JP | 07336994 A | * | 12/1995 | ........... H02K/44/06 |
| JP | 09-002393 | | 1/1997 | |
| JP | 09002393 A | * | 1/1997 | ........... B63H/25/42 |
| JP | 10037524 A | * | 2/1998 | ............. E04H/9/02 |
| JP | 10045095 A | * | 2/1998 | ........... B63H/25/04 |
| JP | 10167196 A | * | 6/1998 | ............. B64G/1/26 |
| JP | 10181691 A | * | 7/1998 | ........... B63H/25/42 |
| JP | 10259851 A | * | 9/1998 | ............ F16F/15/02 |
| JP | 2001-219899 | | 8/2001 | |
| JP | 3396380 B2 | * | 4/2003 | ........... B63H/21/22 |
| JP | 3396381 B2 | * | 4/2003 | ........... B63H/21/22 |
| WO | WO 00/65417 A1 | | 11/2000 | |
| WO | WO 01/34463 A2 | | 5/2001 | |

* cited by examiner

| SAMPLING PERIOD | 0.1 | α | 0.5 |
|---|---|---|---|
| ζ | 10.0 | $k_{max}$ | 20 |
| k | 50.0 | N | 2 |
| T | 0.2 | | |

Fig. 9 A

| $r_1$ | 0.1 | $s_{f1}$ | 0.001 |
|---|---|---|---|
| $r_2$ | 1.0 | $s_{f2}$ | 0.001 |
| $r_3$ | 1.0 | $q_1$ | 0.1 |
| $r_4$ | 0.1 | $q_2$ | 0.1 |
| $r_5$ | 0.1 | $q_p$ | 1000 |
| | | δ | 0.02 |

Fig. 9 B

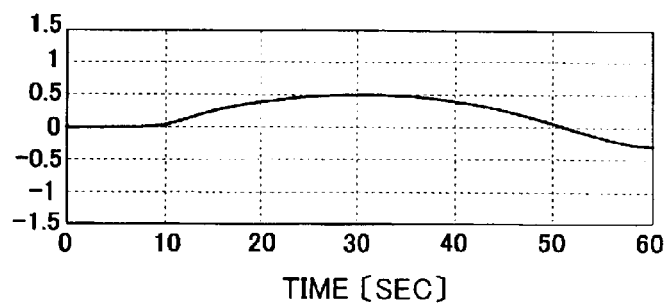
Fig. 1 1 A
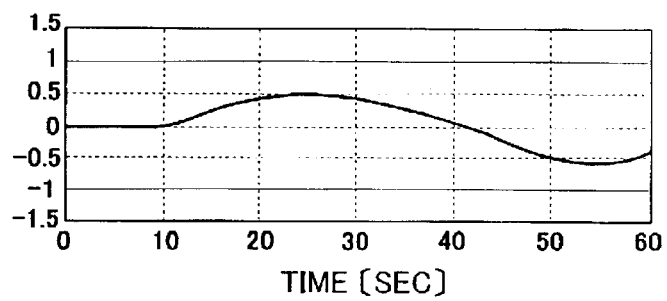
Fig. 1 1 B
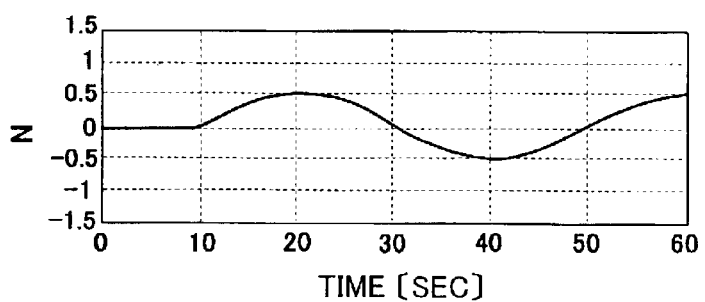
Fig. 1 1 C
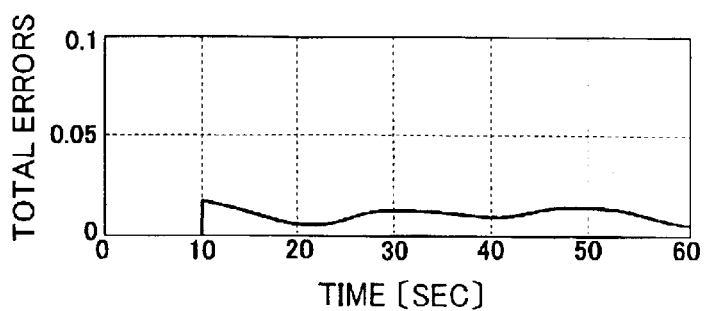
Fig. 1 1 D

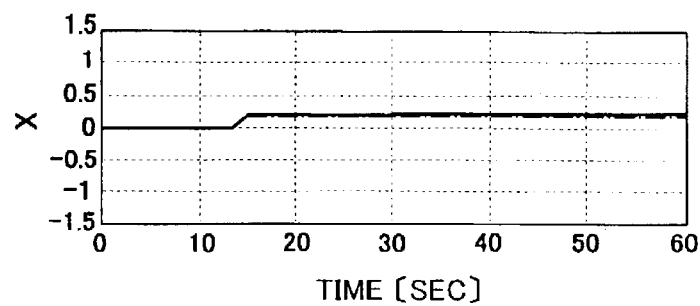
Fig. 1 3 A
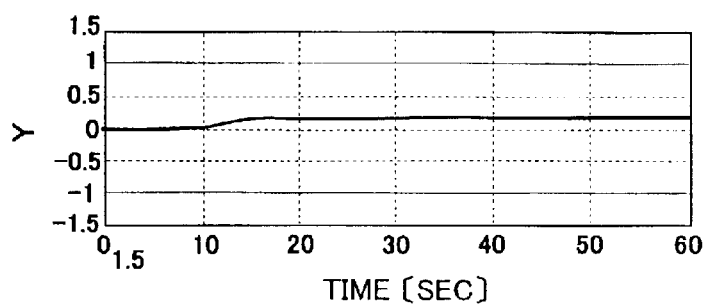
Fig. 1 3 B
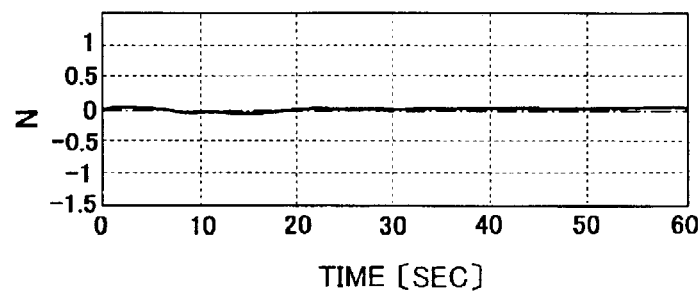
Fig. 1 3 C
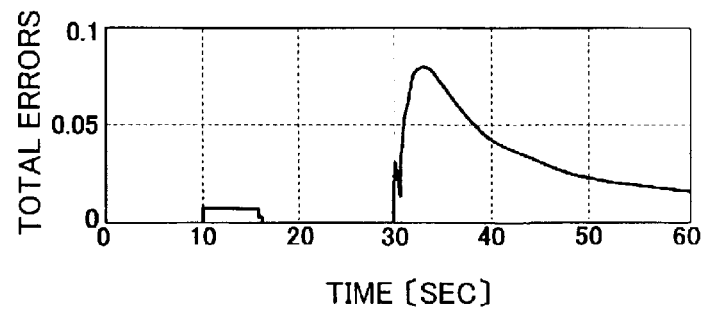
Fig. 1 3 D

METHOD AND DEVICE FOR ALLOCATING THRUST

BACKGROUND OF THE INVENTION

1. Field of the Invention

The present invention relates to a method of allocating thrusts in air and water craft (hereinafter referred to as craft) such as a ship and an airship by calculating manipulated variables to be given to a plurality of thrust generators equipped in the craft to allow the craft to generate a desired thrust, and a thrust allocating device for use in the method.

2. Description of the Related Art

Commonly, air and water craft such as a ship including a car ferry and a submarine, and an airship, is equipped with a plurality of thrust generators (thrusters). In order for the craft to run or be held at a fixed point, it is necessary to drive the plurality of thrust generators. In this case, there are several combinations of thrusts generated by the thrust generators to generate one thrust in the entire craft. In order to minimize fuel consumption in the thrust generators, allocation of the generated thrusts to the thrust generators becomes important. To meet such requirement, various methods of allocating the thrusts generated by the thrust generators have been proposed for the purpose of generating a targeted thrust in the entire craft.

One such method is disclosed in Japanese Laid-Open Patent Application Publication No. Hei. 1-311997. This thrust allocating method is to calculate thrusts generated by the thrust generators that satisfy force balance and moment balance (restricting condition) between the thrusts generated by the thrust generators and the thrust in the entire craft and minimize a value of a predetermined performance index associated with the thrusts generated by the thrust generators.

Japanese Laid-Open Patent Application Publication No. Hei. 2001-219899 discloses a thrust allocating method in which, in craft equipped with turnable thrust generators, thrusts generated by the thrust generators that meet limitation of rated thrusts and operational angle ranges (turning angle ranges) of the thrust generators and minimize energy consumption are calculated. In this thrust allocating method, the thrusts generated by thrust generators that satisfy force balance and moment balance and minimize a value of a performance index associated with the thrusts generated by the thrust generators are calculated, and when the calculated thrusts are larger than the rated thrusts, a parameter corresponding to the associated thrust generator is changed and the thrust is re-calculated, or when there is a thrust generator whose azimuth is within a prohibition angle range, the azimuth is set outside the prohibition angle range.

Japanese Laid-Open Patent Application Publication No. Hei. 9-2393 discloses a thrust allocating method in which, in craft equipped with turnable thrust generators, thrusts generated by the thrust generators are calculated so as to minimize turning angles of the thrust generators. This thrust allocating method is to calculate the thrusts generated by the thrust generators that minimize the turning angles of the thrust generators by minimizing a value of a performance index associated with the turning angles of the thrust generators while keeping force balance and moment balance.

However, in the above-mentioned conventional thrust allocating method, the force balance and moment balance, i.e., the restricting condition, is not determined based on non-linear characteristics or dynamic characteristics of the thrust generators. Commonly, the thrust generators exhibit non-linear characteristics. One example is that, when the thrust generator is a propeller, the relationship between a rotational speed of the propeller and the corresponding generated thrust is non-linear. When the propeller is driven at a rotational speed (manipulated variable) proportional to the thrust derived from calculation in order to generate such thrust, there causes a large error between a targeted thrust and an actually generated thrust. For this reason, the conventional thrust allocating method is incapable of controlling the thrusts generated by the thrust generators with high precision.

In addition, the thrust generator has some dynamic characteristics such as delay. This would occur in the thrust generator provided with a rudder which responds at a relatively slow speed. In such a thrust generator, when the rudder is driven so that that the rudder angle is changed to generate the thrust derived from the calculation, it takes time to change the rudder to a desired rudder angle. Also, in this case, the conventional thrust allocating method is incapable of controlling the thrust generated by the thrust generator with high precision.

The above-mentioned performance index commonly involves weighting factors by which a state variable representing a state of the thrust generator and/or a manipulated variable of the thrust generator is to be multiplied. In the event of a failure in any of the thrust generators, it is necessary to set the thrust generator with the failure not to operate by, for example, changing the weighting factor associated with the thrust generator, and allocate thrusts to the remaining thrust generators. By doing so, a targeted thrust in the entire craft is correctly gained. However, in the conventional thrust allocating method, the weighting factor cannot be changed on line, i.e., in real time, and therefore when the failure occurs in the thrust generator, the thrusts generated by the remaining thrust generators cannot be correctly gained. Consequently, thrust allocation is substantially impossible.

SUMMARY OF THE INVENTION

The present invention addresses the above-described condition, and an object of the present invention is to provide a thrust allocating method that is capable of controlling thrusts generated by thrust generators with higher precision than the conventional method and a thrust allocating device for use in the thrust allocating method.

Another object of the present invention is to provide a thrust allocating method, in which when failure occurs in any of the thrust generators, calculation is correctly performed based on the thrusts generated by the remaining thrust generators, and a thrust allocating device for use in the thrust allocating method.

According to the present invention, there is provided a method of allocating thrusts in air and water craft equipped with a plurality of thrust generators that generate thrusts corresponding to manipulated variables, comprising calculating the manipulated variables given to the plurality of thrust generators to allow the air and water craft to run with a given targeted thrust or to be held at a fixed point, wherein based on force balance and moment balance between the thrusts generated by the thrust generators and a thrust of the air and water craft, which is predetermined based on non-linear characteristics of the thrust generators, and based on a predetermined performance index associated with state variables relating to states of the thrust generators and/or the thrusts generated by the thrust generators, for minimizing the thrusts generated by the thrust generators, the manipulated variables of the thrust generators that satisfy balance between the manipulated variables and the targeted thrust and a predetermined condition of the performance index are calculated.

In addition, there is provided a device for allocating thrusts in air and water craft equipped with a plurality of thrust generators that generate thrusts corresponding to manipulated variables, the device being configured to calculate the manipulated variables given to the plurality of thrust generators to allow the air and water craft to run with a given targeted thrust or to be held at a fixed point, comprising: a calculating means for calculating the manipulated variables of the thrust generators that satisfy balance between the manipulated variables and the targeted thrust and a predetermined condition of a predetermined performance index, based on force balance and moment balance between the thrusts generated by the thrust generators and a thrust of the air and water craft, which is predetermined based on non-linear characteristics of the thrust generators, and based on the predetermined performance index associated with state variables relating to states of the thrust generators and/or the thrusts generated by the thrust generators, for minimizing the thrusts generated by the thrust generators.

In accordance with the above invention, the force balance and moment balance between the thrusts generated by the thrust generators and the thrust in the air and water craft is predetermined based on the non-linear characteristics of the thrust generators, and among combinations of the thrusts generated by the thrust generators that satisfy the balance with respect to the targeted thrust, the combination of thrusts that satisfies the predetermined condition of the performance index is obtained. With this configuration, even in the air and water craft equipped with the thrust generator which does not exhibit linearity in the relationship between the manipulated variable and the generated thrust, the manipulated variable required to obtain the targeted thrust can be correctly calculated. As a result, the thrusts generated by the thrust generators can be controlled with higher precision than in the conventional method.

Preferably, the balance is predetermined based on the non-linear characteristics and dynamic characteristics of the thrust generators.

With this configuration, even in the case of air and water craft equipped with a thrust generator which does not exhibit linearity in the relationship between the manipulated variable and the generated thrust and has a delay between the time when an operation instruction is given and the time when the thrust is generated as instructed, i.e., has a dynamic characteristic, the manipulated variable required to obtain the targeted thrust can be calculated correctly, and the thrusts generated by the thrust generators can be controlled with higher precision than in the conventional method.

The balance is given by formulae (1) to (3):

$$\sum_{i=1}^{n} f_{xi} = X \tag{1}$$

$$\sum_{i=1}^{n} f_{yi} = Y \tag{2}$$

$$\sum_{i=1}^{n} (k_{1i} f_{xi} + k_{2i} f_{yi}) = N \tag{3}$$

where
- X is a longitudinal component of the thrust of the air and water craft,
- Y is a lateral component of the thrust of the air and water craft,
- N is a thrust moment in a turning direction of the air and water craft,
- $f_{xi}$ is a longitudinal component of the thrust generated by an i-th thrust generator,
- $f_{yi}$ is a lateral component of the thrust generated by the i-th thrust generator,
- $k_{1i}$ and $k_{2i}$ are coefficients, and
- i is 1 to n (n: natural number)

The thrusts $F(t)=[f_{x1} \ldots f_{xn} f_{y1} \ldots f_{yn}]^T$ generated by the thrust generators are given by a non-linear equation (4):

$$F(t)=h[x(t), u(t),t] \tag{4}$$

when the manipulated variables of the thrust generators are represented by $u(t)=[u_1 \ldots u_m]^T$ (m: positive integer) of the thrust generators,
where
- t is time variable, and
- x are state variables given by non-linear differential equations (5):

$$\dot{x}(t)=g[x(t), u(t),t] \tag{5}$$

Thereby, the dynamic characteristic of the thrust generator that exhibits non-linearity can be modeled more accurately and the thrusts generated by the thrust generators can be controlled with higher precision than in the conventional method.

The manipulated variables u may be determined to satisfy relationship represented by a formula (6):

$$|u_j(t)|<u_j\max \tag{6}$$

where
- $u_{jmax}$ is a constant, and
- j is 1 to m (m: natural number)

The state variables x may be determined to satisfy relationship represented by a formula (7)

$$|x_i(t)|<x_i\max \tag{7}$$

where
$X_{imax}$ is a constant.

For example, in the thrust generator comprised of one propeller and one rudder placed behind the propeller, when a fluid is carried rearward by the propeller and the rudder is steered to cross the flow of the fluid, a rudder force is generated by the rudder, thereby generating a lateral force (lateral component of the thrust). On the other hand, when the fluid is carried forward by reverse rotation of the propeller and the rudder is steered to cross the flow of the fluid, the rudder force with respect to the flow of fluid being carried, and hence, the lateral force is not substantially generated. Such a non-linear model is represented by the formula (4). As a result, the non-linear characteristic of the thrust generator can be modeled more accurately and the thrusts to be generated by the thrust generators can be controlled with higher precision than in the conventional method.

The thrust generators may be azimuth thrusters and the balance may be given by formulae (8) to (10)

$$\sum_{i=1}^{n} T_i \cos\theta_i = X \quad (8)$$

$$\sum_{i=1}^{n} T_i \sin\theta_i = Y \quad (9)$$

$$\sum_{i=1}^{n} T_i(-yo_i \cos\theta_i + xo_i \sin\theta_i) = N \quad (10)$$

where
- $T_i$ is a propeller thrust of the i-th thrust generator,
- $\theta_i$ is a turning angle of the i-th thrust generator,
- $xo_i$ is a position of the i-th thrust generator that is relative to a center of gravity of the air and water craft in a longitudinal direction of the craft, and
- $yo_i$ is a position of the i-th thrust generator that is relative to the center of gravity of the air and water craft in a lateral direction of the craft.

The performance index J may be given by a formula (11)

$$J = \phi[x(t+T)] + \int_{t}^{t+T} L[x(t'), u(t')] dt' \quad (11)$$

where
- $\Phi$ and L are scalar value functions differentiable up to a predetermined order or more,
- T is a constant, and
- t' is a variable that satisfies $t \leq t' \leq t+T$, and
- the predetermined condition is given to minimize or maximize the value of the performance index J.

A feedback control that minimizes the performance index whose evaluation interval changes is called a Receding Horizon control.

Here, a new time variable $\tau$ is introduced, in which $\tau=0$ always corresponds to the actual time t. The above problem resolves itself to finite time optimal control problem on $\tau$ axis associated with time t as represented by formulae (12) to (14):

$$x^*_\tau(\tau,t) = g[x^*(\tau,t), u^*(\tau,t)] \quad (12)$$

$$x^*(0, t) = x(t) \quad (13)$$

$$J = \phi[x^*(T, t)] + \int_0^T L[x^*(\tau, t), u^*(\tau, t)] d\tau \quad (14)$$

where subscripts represent partial differential and * is added to a variable on the time axis $\tau$. $X^*(\tau, t)$, $u^*(\tau, t)$ represent an optimal track and an optimal manipulated variable which are in a range of (T put forward of x(t)). An actual manipulated variable is represented by a formula (15).

$$u(t) = u^*(0,t) \quad (15)$$

With regard to the time axis $\tau$, there is a normal optimal control problem. Here, using $\lambda^*$ $\rho^*$ as undetermined multiplier factors, Hamiltonian H is defined by a formula (16):

$$H = L + \lambda^{*T} f + \rho^{*T} C \quad (16)$$

where:
C=a vector value function given by a formula (17)

$$C = \begin{bmatrix} \sum_{i=1}^{n} f_{xi} - X \\ \sum_{i=1}^{n} f_{yi} - Y \\ \sum_{i=1}^{n} (k_{1i} f_{xi} + k_{2i} f_{yi}) - N \end{bmatrix} \quad (17)$$

From this, Euler Lagrange equations represented by formulae (18) to (23) are derived:

$$\lambda^*_\tau(\tau,t) = -H_x^T \quad (18)$$

$$H_u = 0 \quad (19)$$

$$x^*_\tau(\tau,t) = H_\lambda^T \quad (20)$$

$$C[x^*(\tau,t), u^*(\tau,t), \tau] = 0 \quad (21)$$

$$x^*(0,t) = x(t) \quad (22)$$

$$\lambda^*(T,t) = \phi_x^T[x^*(T,t)] \quad (23)$$

With regard to the above Receding Horizon control, a solving method in rear time has been proposed in Measurement and Control vol. 36, No. 11 (November, 1997), pp 776–783. By configuring the thrust allocating method and thrust allocating device using this solving method, the thrust allocation in the air and water craft is conducted on line, i.e., in real time.

Preferably, the performance index J includes weighting factors relating to the state variables x and/or the manipulated variables u, and the weighting factors are changed on line.

With this configuration, when failure occurs in any of the thrust generators equipped in the air and water craft, the weighting factors relating to the state variables x and/or manipulated variables u associated with the thrust generator are suitably changed to cause the thrust generator not to operate, thereby continuing thrust allocation in the remaining thrust generators.

Preferably, a failure that has occurred in the thrust generator is detected, and upon detection, the weighting factors relating to the state variables x and/or the manipulated variables u of the thrust generator in which the failure has occurred are changed. Thereby, the weighting factor can be automatically changed when failure occurs in the thrust generator.

This object, as well as other objects, features and advantages of the invention will become more apparent to those skilled in the art from the following description taken with reference to the accompanying drawings.

BRIEF DESCRIPTION OF THE DRAWINGS

FIG. 9A is a table showing set values of parameters used in experiment conducted on the thrust allocating device according to the first embodiment;

FIG. 9B is a table showing set values of coefficients used in experiment conducted on the thrust allocating device according to the first embodiment;

FIG. 11A is a graph showing an example of a result of experiment conducted on the thrust allocating device according to the first embodiment and time-series change in a longitudinal component of a thrust of the entire ship;

FIG. 11B is a graph showing an example of the result of experiment conducted on the thrust allocating device according to the first embodiment and time-series change in a lateral component of the thrust of the entire ship;

FIG. 11C is a graph showing an example of the result of experiment conducted on the thrust allocating device according to the first embodiment and time-series change in a thrust moment in a turning direction of the entire ship;

FIG. 11D is a graph showing an example of the result of experiment conducted on the thrust allocating device according to the first embodiment and time-series change in total errors in a thrust calculation process;

FIG. 13A is a graph showing another example of a result of experiment conducted on the thrust allocating device according to the first embodiment and time-series change in a longitudinal component of the thrust of the entire ship;

FIG. 13B is a graph showing another example of the result of experiment conducted on the thrust allocating device according to the first embodiment and time-series change in a lateral component of the thrust of the entire ship;

FIG. 13C is a graph showing another example of the result of experiment conducted on the thrust allocating device according to the first embodiment and time-series change in a thrust moment in the turning direction of the entire ship;

FIG. 13D is a graph showing another example of the result of experiment conducted on the thrust allocating device according to the first embodiment and time-series change in total errors in the thrust calculation process according to the first embodiment;

FIG. 22 is a graph showing time-series changes in turning angles of the thrust generators in the experiment 1;

FIG. 27 is a schematic plan view showing a result of the experiment 2;

FIG. 32 is a graph showing time-series change in a longitudinal component of the thrust of the entire ship in the experiment 2;

DETAILED DESCRIPTION OF THE PREFERRED EMBODIMENTS

Hereinafter, embodiments of a thrust allocating device of the present invention will be described with reference to the accompanying drawings.

Embodiment 1

Figure 1:
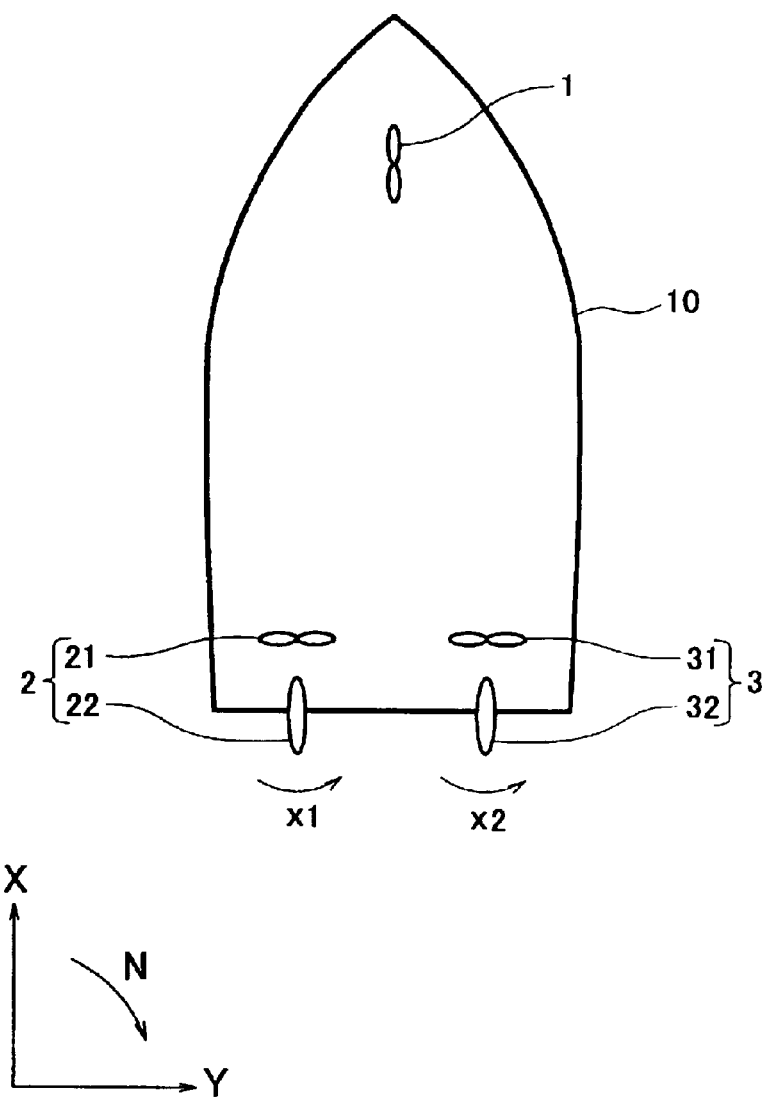
FIG. 1 is a schematic view showing a construction of a ship equipped with a thrust allocating device according to a first embodiment of the present invention.

FIG. 1 is a schematic view showing a construction of a ship equipped with a thrust allocating device according to a first embodiment of the present invention. Referring now to FIG. 1, a ship 10 is equipped with three thrust generators 1, 2, and 3. The thrust generator 1 is so-called bow thruster provided on a bow side of the ship 10 and is adapted to generate a thrust in a lateral direction of a body of the ship 10 as indicated by an arrow Y.

The thrust generator 2 has a propeller 21 and a rudder 22 provided behind the propeller 21 and the thrust generator 3 has a propeller 31 and a rudder 32 provided behind the propeller 31. The thrust generator 2 is provided on a left side on an aft part and the thrust generator 3 is provided on a right side of the aft part. The propellers 21 and 31 are each rotatable around a rotational axis extending along the longitudinal direction of the body. By rotation of the propellers 21 and 31, thrusts are generated in the longitudinal direction of the body as indicated by an arrow X. The rudders 22 and 32 are each turnable in the lateral direction of the body. By inclining the rudders 22 and 32 with respect to the direction of flow of fluid such as sea water being carried rearward by the propellers 21 and 31, rudder forces are generated in their main surfaces (rudder faces). Thereby, thrusts are generated from the thrust generators 2 and 3 in the direction perpendicular to inclination angles (rudder angles) of the rudders 22 and 32.

Figure 2:
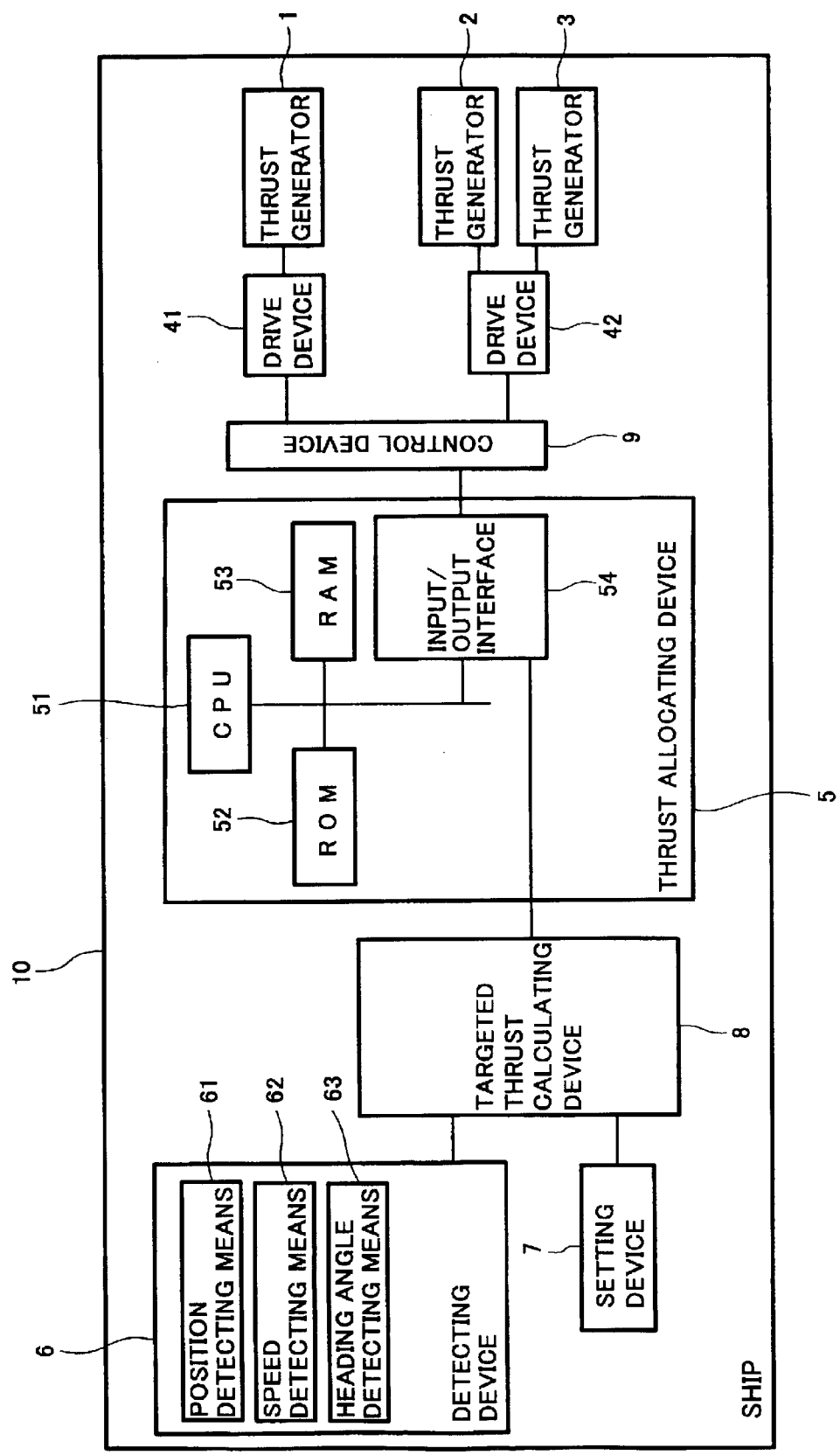
FIG. 2 is a block diagram showing the construction of the ship equipped with the thrust allocating device according to the first embodiment.

FIG. 2 is a block diagram showing a construction of the ship 10 equipped with the thrust allocating device according to the first embodiment. Referring to FIG. 2, in addition to the thrust generators 1 to 3, the ship 10 comprises drive devices 41 and 42, a thrust allocating device 5, a detecting device 6, a setting device 7, a targeted thrust calculating device 8 and a control device 9.

The drive device 41 is connected to the thrust generator 1. The drive device 41 is comprised of an engine, a transmission, and the like, and is configured to rotate the thrust generator 1 at a desired speed.

The drive device 42 is connected to the thrust generators 2 and 3. The drive device 42 is comprised of an engine, a transmission, a differential gear, a hydraulic unit, and the like, and is configured to rotate the propellers 21 and 31 at desired rotation speeds and incline the rudders 22 and 32 to desired rudder angles. The drive device 42 is also configured to rotate the propellers 21 and 31 at different rotation speeds and incline the rudders 22 and 32 to different rudder angles.

A detecting device 6 comprises a position detecting means 61 such as GPS (Global Positioning System), for detecting a current position of the ship 10, a speed detecting means 62 for detecting a ship speed (ground speed) of the ship 10, and a heading angle detecting means 63 such as a gyro compass, for detecting a heading angle of the ship 10. The detecting device 6 is connected to the targeted thrust calculating device 8 and is configured to output the detected current position, ship speed and heading angle of the ship 10 to the targeted thrust calculating device 8.

The setting device 7 is configured to set a position, a ship speed and a heading angle of the ship 10. The setting device 7 has an operation unit (not shown). An operator (helmsman) or the like operates the operation unit to set the position, ship speed and heading angle of the ship 10, but this is only illustrative. Alternatively, the setting device 6 may be configured to automatically set the position, ship speed and heading angle of the ship 10.

The setting device 7 is connected to the targeted thrust calculating device 8 and is configured to output the set position, ship speed and heading angle of the ship 10 to the targeted thrust calculating device 8.

The targeted thrust calculating device 8 is comprised of a CPU, a ROM, a RAM, and the like, and is configured to calculate a longitudinal component and lateral component of a targeted thrust of the entire ship 10 and a targeted thrust moment in a turning direction of the ship 10, based on the current position, ship speed, and heading angle of the ship 10 which are input from the detecting device 6, and the position, ship speed, and heading angle of the ship 10 which are input from the setting device 7. The targeted thrust calculating device 8 is connected to the thrust allocating device 5 and is configured to output the calculated longitudinal component and lateral component of the targeted thrust and the calculated targeted thrust moment in the turning direction to the thrust allocating device 5.

While the longitudinal component and lateral component of the targeted thrust and the targeted thrust moment in the turning direction which are calculated by the targeted thrust calculating device 8 are input to the thrust allocating device 5, the operator the like may directly input these to the thrust allocating device 5 with an input device such as a joystick.

As described later, the thrust allocating device 5 is configured to calculate propeller thrusts of the thrust generators 1 to 3 and rudder angles of the rudders 22 and 32 based on the longitudinal component and lateral component of the targeted thrust and the targeted thrust moment in the turning direction which are input from the targeted thrust calculating device 8. The thrust allocating device 5 is connected to the control device 9 and is configured to output the calculated propeller thrusts and rudder angles to the control device 9.

The control device 9 is connected to the drive devices 41 and 42. The ship 10 is provided with rotation speed sensors for detecting a rotation speed of a propeller of the thrust generator 1 and rotation speeds of the propellers 21 and 31 of the thrust generators 2 and 3, and rudder angle sensors for detecting rudder angles of the rudders 22 and 32. The rotation speed sensors and the rudder angle sensors are connected to the control device 9 and are configured to output the detected rotation speeds and rudder angles to the control device 9.

The control device 9 is comprised of a CPU, a ROM, a RAM and the like. The control device 9 is configured to control propeller thrusts and rudder angles of the thrust generators 1 to 3 using, for example, PID control so that the propeller thrusts and rudder angles substantially conform to the propeller thrusts and rudder angles which are output from the thrust allocating device 5, based on the propeller thrusts and rudder angles input from the thrust allocating device 5 and the current propeller rotation speeds and rudder angles which are input from the sensors. The control device 9 is configured to output control signals to the drive devices 41 and 42, which drive the thrust generators 1 to 3.

Further, the control device 9 is configured to judge whether or not the propeller thrusts and rudder angles of the thrust generators 1 to 3 which are measured by the sensors substantially conform to the propeller thrusts and rudder angles which are input from the thrust allocating device 5. When judging that any of these does not conform to the corresponding one, the control device 9 judges that failure has occurred in the corresponding thrust generator, and outputs information indicative of occurrence of the failure to the thrust allocating device 5.

Subsequently, a configuration of the thrust allocating device 5 will be described in more detail. The thrust allocating device 5 is comprised of a CPU 51, a ROM 52, a RAM 53, and an input/output interface 54.

The ROM 52 contains computer programs and data or the like to be used in the computer programs. The CPU 51 is configured to execute the computer programs stored in the ROM 52 or the computer program loaded into the RAM 53. The RAM 53 is used as a work area when the CPU 51 executes the computer program.

The CPU 51, the ROM 52, the RAM 53, and the input/output interface 54 are interconnected through buses to allow data to be transferred to each other. The input/output interface 54 is connected to the targeted thrust calculating device 8 and the control device 9 to allow various data to be transmitted and received between the interface 54 and the targeted thrust calculating device 8 and the control device 9.

Figure 3:
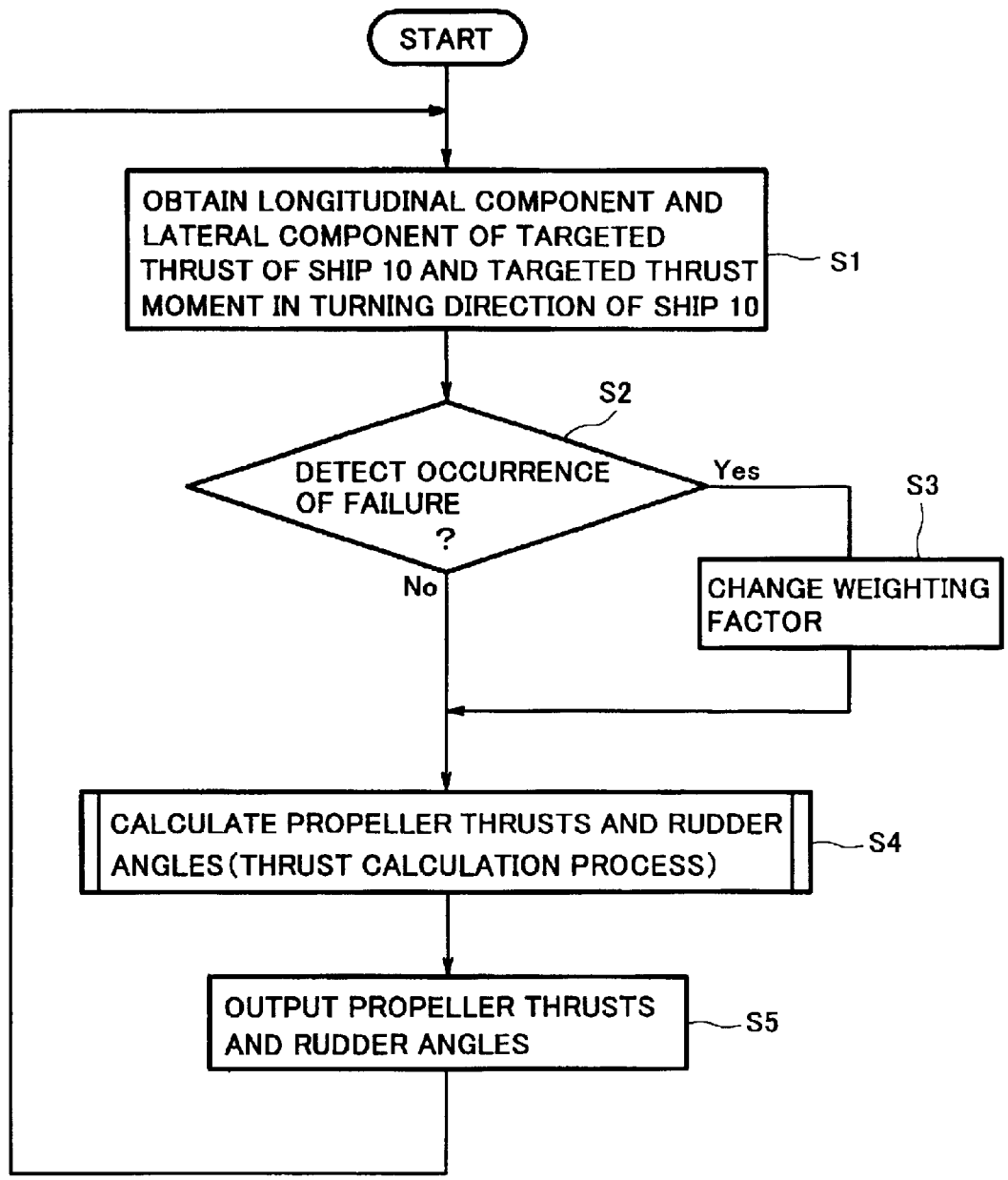
FIG. 3 is a flowchart showing flow of a calculation process of the thrust allocating device according to the first embodiment.

FIG. 3 is a flowchart showing a flow of a calculation process of the thrust allocating device according to the first embodiment. The CPU 51 executes the computer program, and thereby the thrust allocating device 5 performs the process as described below.

First of all, the CPU 51 obtains the longitudinal component and lateral component of the targeted thrust of the ship 10 and the targeted thrust moment in the turning direction of the ship 10 (Step S1). The CPU 51 performs this process with reference to signal values output from the targeted thrust calculating device 8 and received by the input/output interface 54.

Subsequently, the CPU 51 detects occurrence of the failure in the thrust generators 1 to 3 (Step S2). The CPU 51 performs this process by obtaining the information indicative of occurrence of the failure that the input/output interface 54 has received from the control device 9. Upon obtaining such information, the CPU 51 judges that failure has occurred in the thrust generator identified by this information.

When judging that failure has not been detected in any of the thrust generators 1 to 3 in Step S2, the CPU 51 advances the process to Step S4. On the other hand, when judging that the failure has been detected in any of the thrust generators 1 to 3 in Step 2, the CPU 51 changes the corresponding weighting factor (Step S3). The CPU 51 greatly increases the weighting factor associated with the thrust generator in which the failure has occurred, among weighting factors $s_{f1}$, $s_{f2}$, $r_1$ to $r_5$, $q_1$, $q_2$, in a formula (30) mentioned later.

The CPU 51 calculates propeller thrusts of the thrust generators 1 to 3 and rudder angles of the rudders 22 and 32, based on the longitudinal component and lateral component of the targeted thrust and the targeted thrust moment in the turning direction, which have been obtained in Step S1 (Step S4).

The CPU 51 outputs the propeller thrusts and rudder angles calculated in Step S4 to the control device 9 via the input/output interface 54 (step S5), and returns the process to Step S1.

The thrust calculation process performed in Step S4 is based on thrust balance represented by formulae (24) to (26), i.e., an operation model of the ship 10, and a performance index represented by the formula (30).

$$p_{11}[u_2(t) - p_{r1}\eta\{u_2(t)\}v\{x_1(t)\}] + p_{12}[u_3(t) - p_{r2}\eta\{u_3(t)\}v\{x_2(t)\}] = X \quad (24)$$

$$p_{21}u_1(t) + [p_{22}\eta\{u_2(t)\}x_1(t) + p_{23}\eta\{u_3(t)\}x_2(t)] = Y \quad (25)$$

$$p_{31}u_1(t) + [p_{32}\eta\{u_2(t)\}x_1(t) + p_{33}\eta\{u_3(t)\}x_2(t)] + \quad (26)$$
$$p_{34}[u_2(t) - p_{r1}\eta\{u_2(t)\}v\{x_1(t)\}] +$$
$$p_{35}[u_3(t) - p_{r2}\eta\{u_3(t)\}v\{x_2(t)\}] = N$$

where:

$u_1(t)$=a normalized propeller thrust of the thrust generator 1

$u_2(t)$=a normalized propeller thrust of the thrust generator 2

$u_3(t)$=a normalized propeller thrust of the thrust generator 3

$x_1(t)$=a normalized rudder angle of the thrust generator 2

$x_2(t)$=a normalized rudder angle of the thrust generator 3

$p_{11}$ to $p_{35}$=predetermined coefficients $\eta(x)$=function represented by a formula (27)

$v(x)$=function represented by a formula (28)

X=a longitudinal component of a thrust of the ship 10

Y=a lateral component of the thrust of the ship 10

N=a thrust moment in a turning direction of the ship 10.

$$\eta(x) = \frac{1}{k_1}\log(1 + e^{k_1 x}) \quad (27)$$

where:

$k_1$=constant $$v(x) = \frac{2}{k_2}\log(1 + e^{k_2 x}) + x \quad (28)$$

where:

$k_2$=constant

A rudder speed $u_4(t)$ of the rudder 22 of the thrust generator 2 and a rudder speed $u_5(t)$ of the rudder 32 of the thrust generator 3 are given by a formula (29):

$$\frac{d}{dt}\begin{bmatrix} x_1(t) \\ x_2(t) \end{bmatrix} = \begin{bmatrix} u_4(t) \\ u_5(t) \end{bmatrix} \quad (29)$$

$$J = \frac{1}{2}[s_{f1}\{x_1(t) - \alpha\}^2 + s_{f2}\{x_2(t) + \alpha\}^2] + \quad (30)$$
$$\frac{1}{2}\int_t^{t+T} \sum_{i=1}^{5} r_i\{u_i(t')\}^2 + q_1\{x_1(t') - \alpha\}^2 + q_2\{x_2(t') + \alpha\}^2 dt'$$

where:

$s_{f1}$ and $s_{f2}$=weighting factors $r_1$ to $r_5$=weighting factors $q_1$ and $q_2$=weighting factors α=constant that defines a neutral point of the rudder angle.

The formula (24) is derived from the formula (1) as described below. Generally, the longitudinal component of the thrust generated by the thrust generator 2 is considered to be the thrust $u_2(t)$ generated by the propeller 21 minus a loss generated by the rudder 22. When the rudder angle $x_1(t)$ of the rudder 22 is equal to zero, the rudder 22 does not substantially generate a rudder force with respect to the flow of fluid being carried rearward by the propeller 21, and therefore, the thrust $u_2(t)$ generated by the propeller 21 substantially becomes the longitudinal component of the thrust generated by the thrust generator 2. On the other hand, when the rudder angle $x_1(t)$ of the rudder 22 is other than zero, the rudder 22 generates the rudder force with respect to the flow of the fluid being carried rearward by the propeller 21, and a drag is generated on its rudder face. Therefore, a loss corresponding to the lateral component is generated in the longitudinal component of the thrust generated by the thrust generator 2.

Figure 4:
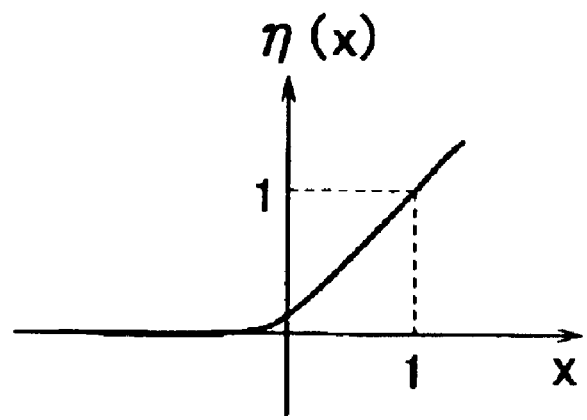
FIG. 4A is a graph representing a function $\eta(x)$ used for modeling a non-linear characteristic of a thrust generator according to the first embodiment.
FIG. 4B is a graph showing a function v(x) used for modeling the non-linear characteristic of the thrust generator.
Figure 4:
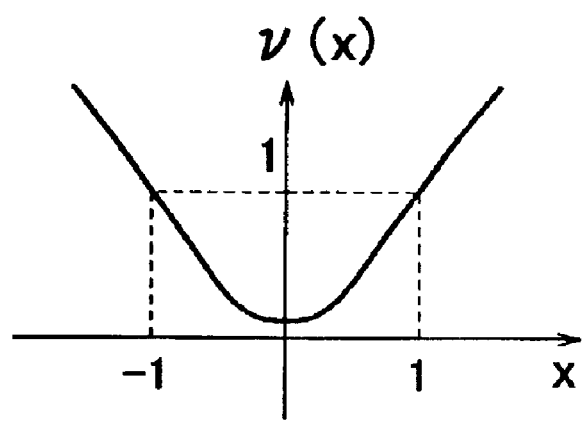

Such a loss is not generated when the propeller 21 rotates in the reverse direction to generate the thrust forward. For modeling the non-linear characteristic of the thrust generator 2, in the first embodiment, the functions $\eta(x)$ and $\nu(x)$ are used. FIG. 4A is a graph showing the function $\eta(x)$ and FIG. 4B is a graph showing the function $\nu(x)$. As shown in FIG. 4A, the function $\eta(x)$ approximates the function $\eta_1(x)$ given by a formula (31) so as to be smoothed around X=0.

$$\eta_1(x) = \begin{cases} x; x \geq 0 \\ 0; x < 0 \end{cases} \quad (31)$$

As shown in FIG. 4B, the function $\nu(x)$ approximates the function $\nu_1(x)$ given by the formula (32) so as to be smoothed around X=0.

$$\nu_1(x) = \begin{cases} x; x \geq 0 \\ -x; x < 0 \end{cases} \quad (32)$$

Therefore, a first term on a left side of the formula (24) is substantially equal to $p_{11}u_2(t)$ when $u_2(t)$ is negative, and is substantially equal to $p_{11}[u_2(t)-p_{r1}u_2(t)|x_1(t)|]$ when $u_2(t)$ is positive. Here, $x_1(t)$ is the rudder angle representing the lateral component (lateral rudder force) of the thrust generated by the thrust generator 2 by $u_2(t) \, x_1(t)$. The constant $p_{11}$ is determined based on the shape or the like of the propeller 21.

As should be appreciated, the first term on the left side of the formula (24) is obtained by modeling the non-linear characteristic of the longitudinal component of the thrust generated by the thrust generator 2. In other words, the formula (24) is such that n is 3 in the formula (1) and the longitudinal component of the thrust generated by the thrust generator 1 is zero. The formula (24) is also such that balance of the longitudinal component of the thrust of the ship 10 is modeled based on the non-linear characteristics of the thrust generators 2 and 3. The thrust generator 3 will not be further described.

A formula (25) is given by substituting 3 in n in the formula (2) and by representing $f_{y1}$, $f_{y2}$, and $f_{y3}$ by formulae (33) to (35).

$$f_{y1} = p_{21} u_1(t) \quad (33)$$

$$f_{y2} = p_{22} \eta\{u_2(t)\} x_1(t) \quad (34)$$

$$f_{y3} = p_{23} \eta\{u_3(t)\} x_2(t) \quad (35)$$

As described above, since the thrust generator 1 is configured such that the propeller extends in the lateral direction of the body of the ship 10 and does not have a means for generating a rudder force, such as a rudder, large part of the thrust is generated in the lateral direction of the ship 10. This follows that the thrust $u_1(t)$ generated by the propeller of the thrust generator 1 substantially becomes the lateral component $f_{y1}$ of the thrust generated by the thrust generator 1. Therefore, a characteristic relating to the lateral component of the thrust generated by the thrust generator 1 is represented by the formula (33).

Meanwhile, since the thrust generator 2 is provided with the rudder 22, a thrust according to the lateral rudder force $u_2(t)x_1(t)$ becomes the lateral component $f_{y2}$ of the thrust. A characteristic relating to the lateral component of the thrust generated by the thrust generator 2 is represented by the formula (34). Since the configuration of the thrust generator 3 is substantially identical to that of the thrust generator 2, a characteristic relating to a lateral component of the thrust generated by the thrust generator 3 is represented by a formula (35) similar to the formula (34).

The formula (26) is given by substituting 3 in n in the formula (3) and by representing $k_{12}$, $k_{22}$, $k_{13}$, $k_{23}$ as described below. With regard to the thrust generator 1, a formula (36) is derived from the formulae (3) and (26).

$$k_{11} f_{x1} + k_{21} f_{y1} = p_{31} u_1(t) \quad (36)$$

From the above-mentioned characteristic of the thrust generator 1, $f_{x1}=0$. In addition, from the formulae (36) and (33), $k_{21}$ in a formula (37) is derived.

$$k_{21} = \frac{p_{31}}{p_{21}} \quad (37)$$

With regard to the thrust generator 2, from the formulae (3) and (26), a formula (38) is derived.

$$k_{12} f_{x2} + k_{22} f_{y2} = p_{34}[u_2(t) - p_{r1}\eta\{u_2(t)\}\nu\{x_1(t)\}] + p_{32}\eta\{u_2(t)\}x_1(t) \quad (38)$$

From the formulae (24) and (34), a formula (39) is derived.

$$k_{12} f_{x2} + k_{22} f_{y2} = \quad (39)$$
$$k_{12} p_{11}[u_2(t) - p_{r1}\eta\{u_2(t)\}\nu\{x_1(t)\}] + k_{22} p_{22}\eta\{u_2(t)\}x_1(t)$$

From the formulae (38) and (39), $k_{12}$ and $k_{22}$ in formulae (40) and (41) are derived.

$$k_{12} = \frac{p_{34}}{p_{11}} \quad (40)$$

$$k_{22} = \frac{p_{32}}{p_{22}} \quad (41)$$

Since the configuration of the thrust generator 3 is substantially identical to that of the thrust generator 2, $k_{13}$ and $k_{23}$ in formulae (42) and (43) are derived in the same manner.

$$k_{13} = \frac{p_{35}}{p_{12}} \quad (42)$$

$$k_{23} = \frac{p_{33}}{p_{23}} \quad (43)$$

In the first embodiment, the description has been given of how the formulae (24) to (26) are derived assuming that the thrust generator 2 is comprised of the propeller 21 and the rudder 22 and the thrust generator 3 is comprised of the propeller 31 and the rudder 32. Alternatively, the formulae (24) to (26) are derived assuming that the propeller and the rudder are independent thrust generators, as described below.

In this case, it is assumed that the propeller 21 is the thrust generator 2, the propeller 31 is the thrust generator 3, the rudder 22 is a thrust generator 4, and the rudder 32 is a thrust generator 5. It should be appreciated that the rudder does not generate a thrust for itself, but an action generated by the rudder, for example, a rudder force, is deemed as a kind of a thrust, and therefore the rudder is handled as the thrust generator.

First, the longitudinal components $f_{x1}$ to $f_{x5}$ of the thrusts generated by the thrust generators 1 to 5 are given by formulae (44) to (48).

$$f_{x1}=0 \tag{44}$$

$$f_{x2}=p_{11}u_2(t) \tag{45}$$

$$f_{x3}=p_{12}u_3(t) \tag{4}$$

$$f_{x4}=p_{11}p_{r1}\eta\{u_2(t)\}\nu\{x_1(t)\} \tag{47}$$

$$f_{x5}=p_{12}p_{r2}\eta\{u_3(t)\}\nu\{x_2(t)\} \tag{48}$$

The longitudinal components $f_{x4}$ and $f_{x5}$ of the thrusts generated by the thrust generators 4 and 5 are considered to be the above-mentioned losses of the thrusts and are therefore given by the formulae (47) and (48). From the formula (1) and the formulae (44) to (48), the formula (24) is derived.

The lateral components $f_{y1}$ to $f_{y5}$ of the thrusts generated by the thrust generators 1 to 5 are given by formulae (49) to (53).

$$f_{y1}=p_{21}u_1(t) \tag{49}$$

$$f_{y2}=0 \tag{50}$$

$$f_{y3}=0 \tag{51}$$

$$f_{y4}=p_{22}\eta\{u_2(t)\}x_1(t) \tag{52}$$

$$f_{y5}=p_{23}\eta\{u_3(t)\}x_2(t) \tag{53}$$

Here, the lateral components $f_{y4}$ and $f_{y5}$ of the thrusts generated by the thrust generators 4 and 5 are considered as the above-described rudder forces and are therefore given by formulae (52) and (53). From the formula (2) and formulae (49) to (53), the formula (25) is derived.

Figure 5:
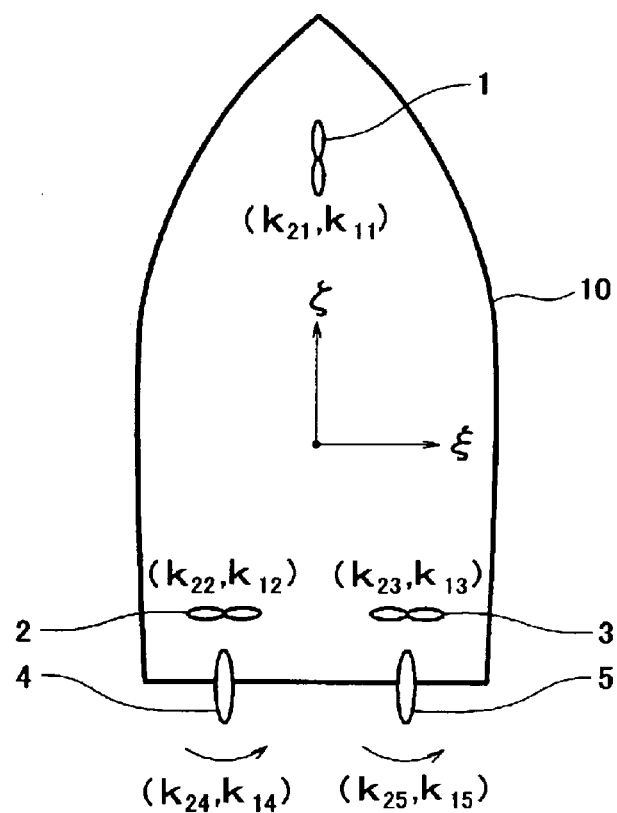
FIG. 5 is a schematic plan view showing a positional relationship between thrust generators on the ship assuming that a propeller and a rudder are independent thrust generators.

FIG. 5 is a schematic plan view showing a positional relationship of the thrust generators 1 to 5 on the ship 10. As shown in FIG. 5, a ζ-ξ coordinate system with a center of the body of the ship 10 as an origin, ζ-axis extending from the origin toward the bow, and ξ-axis extending from the origin to right side. Here, $(k_{2i}, k_{1i})$ (i=1 to 5) are coordinates in the ζ-ξ coordinate system of the thrust generator i. From $k_{11}$ to $k_{15}$, $k_{21}$ to $k_{25}$, $f_{x1}$ to $f_{x5}$, $f_{y1}$ to $f_{y5}$, and the formula (3), the formula (26) is derived.

In this manner, assuming that the propeller and the rudder are independent thrust generators, the balance of the thrusts in the formulae (24) to (26) are obtained.

Figure 6:
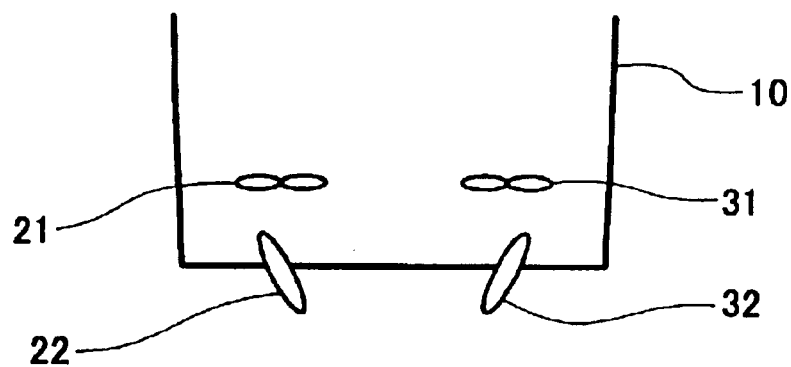
FIG. 6A is a schematic view showing V-shaped rudders' neutral angles in the ship according to the first embodiment.
FIG. 6B is a schematic view showing inverted-V shaped rudders' neutral angles in the ship according to the first embodiment.
Figure 6:
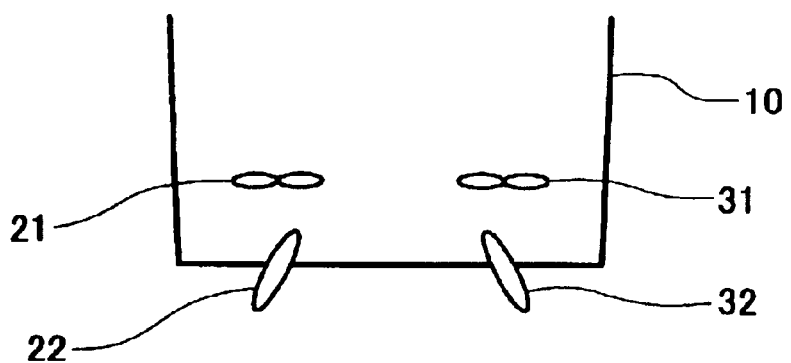

A constant α that defines a neutral point of the rudder angle in the formula (30) will now be described. FIGS. 6A and 6B are schematic views showing states of the rudders 22 and 32. In the ship 10, the rudders 22 and 32 may be inclined inwardly by a predetermined angle to form a substantially V shape as shown in FIG. 6A or may be inclined outwardly by a predetermined angle to form a substantially inverted-V shape as shown in FIG. 6B. Hereinafter, the state in FIG. 6A is called V rudder and the state in FIG. 6B is called inverted-V rudder. By inclining the rudders 22 and 32 by an equal angle toward the opposite directions in this manner, the lateral rudder force of the rudder 22 and the lateral rudder force of the rudder 32 cancel each other and the lateral thrusts of thrust generators 2 and 3 are not generated in the entire ship 10. Accordingly, in the formula (30), α is a normalized value of the rudder angle of the rudder 22 in the V shape or inverted-V shape. This defines the neutral point of the rudder angle in the V shape or inverted-V shape. With the V rudder or the inverted-V rudder set, by generating a propeller forward thrust, a rudder lateral force is generated immediately even when the rudder speed is slow.

Further, the propeller thrusts $u_1(t)$, $u_2(t)$, $u_3(t)$ and the rudder angles $u_4(t)$ and $u_5(t)$ have limitations represented by the following formula (54).

$$|u_i(t)| \leq u_{im} \tag{54}$$

where:
i=1 to 5 (integer)
$u_{1m}$ to $u_{3m}$=upper or lower limit values of the propeller thrusts of the thrust generators 1 to 3
$u_{4m}$ and $u_{5m}$=upper or lower limit values of the rudder speeds of the rudders 22 and 32.

Thus, since the propeller thrusts of the thrust generators 1 to 3 and the rudder speeds of the rudders 22 and 32 have the predetermined upper or lower limit values, dynamic characteristic models of the thrust generators 1 to 3 are represented as containing an inequality restriction condition represented by the formula (54). The inequality restricting condition is difficult to handle in thrust calculation, and is therefore converted into an equality restriction condition represented by a formula (55).

$$u_i^2(t)+u_d^2-u_{im}^2=0 \tag{55}$$

where:
$u_d$=dummy variable
The equality restriction condition of the formula (55) may be replaced by an equality restriction condition (56).

$$u_i(t)-u_{im}\sin(u_d)=0 \tag{56}$$

When the equality restriction condition using the dummy variable is used, unknown variables are increased, which causes an increase in the calculation amount. When the propeller thrust or rudder speed obtained by calculation exceeds the upper or lower limit value, the upper or lower limit value is forcibly set as the propeller thrust or the rudder speed.

The weighting factors $q_1$ and $q_2$ in the formula (30) may be replaced by weights $q_{p1}$ and $q_{p2}$ according to a penalty method represented by a formula (57).

$$q_{pi}=q_i+k_p[\max\{|x_i(t)|-(x_{im}-\delta), 0\}]^2 \tag{57}$$

where:
i=1 or 2
$q_i$=normal weighting factor
$k_p$=coefficient
$x_{im}$=upper or lower limit values of the rudder angles of the rudders 22 and 32
δ=positive constant
δ satisfies δ<$x_{im}$. The second term of a right side of the formula (57) is penalty for restricting a state variable $x_i(t)$ within a limitation value ($x_{im}$-δ) and $k_p$ is a parameter for adjusting the magnitude of the penalty. Therefore, $q_{pi}$ is equal to the normal weighting factor $q_i$ when the state variable $x_i(t)$ is within the limitation value $(x_{im}-\delta)$ and $q_{pi}$ much larger than the weighting factor $q_i$ when the state variable $x_i(t)$ is larger than the limitation value $(x_{im}-\delta)$. The max function outputs a larger value of arguments and the square thereof is a differentiable smooth function. $\delta$ is the parameter for making adjustment so that the weight $q_{pi}$ is increased from the point before the state variable $x_i(t)$ exceeds $x_{im}$.

In step S2, when failure has been detected in any of the thrust generators 1 to 3, in Step S3, the weighting factor associated with the thrust generator on which the failure has occurred is greatly increased so that a command value of thrust generation to the thrust generator becomes approximately zero. As a result, thrust allocation to the remaining normal thrust generators can be appropriately performed.

The thrust calculation process in Step S4 is to calculate the propeller thrusts $u_1(t)$ to $u_3(t)$, the rudder speeds $u_4(t)$ and $u_5(t)$ and the rudder angle $x_1(t)$ and $x_2(t)$ that satisfy the balance of the thrusts represented by the formulae (24) to (26) and minimize a value of the performance index of the formula (30).

Here, an example of the thrust calculation process in Step S4 will be descried. For the sake of simplicity, the formulae (24) to (30) are represented in the form of the formulae (1) to (5) and (11). $x(t)$ and $u(t)$ are vectors in formulae (58) and (59) and define a function C of a formula (60).

$$x(t) \in R^{m'} \tag{58}$$

$$u(t) \in R^{m} \tag{59}$$

$$C[x(t), u(t)] = \begin{bmatrix} \sum_{i=1}^{n} f_{xi} - X \\ \sum_{i=1}^{n} f_{yi} - Y \\ \sum_{i=1}^{n} (k_{1i} f_{xi} + k_{2i} f_{yi}) - N \end{bmatrix} \tag{60}$$

Therefore, the restricting conditions of the formulae (1) to (3) are represented by a formula (61) using the function C.

$$C[x(t),u(t)]=0 \tag{61}$$

In this example, the thrust calculation process is performed in such a manner that an evaluation interval T is divided into N steps and a discrete and approximate following problem is solved.

$$C[x^*_j(t), u^*_j(t)]=0 \tag{62}$$

$$x^*_{j+1}(t)=x^*_j(t)+g[x^*_j(t), u^*_j(t)]\cdot \Delta\tau \tag{63}$$

$$x^*_0(t)=x(t) \tag{64}$$

$$J = \phi[x^*_N(t)] + \sum_{i=0}^{N-1} L[x^*_j(t), u^*_j(t)]\Delta\tau \tag{65}$$

In these formulae, $x^*j(t)$ represents the state of a j-th step in the discrete and approximate system under the condition in which $x(t)$ is an initial state. When $\Delta\tau=T/N$, $x^*j(t)$ is $x(t+j\Delta\tau)$.

In this case, formulae (66) to (68) need to be satisfied. Here, subscripts represent partial differential.

$$H_u[x^*_j(t), \lambda^*_{j+1}(t), u^*_j(t)]=0 \tag{66}$$

$$\lambda^*_j(t) = \lambda^*_{j+1}(t) + H_x^T[x^*_j(t), \lambda^*_{j+1}(t), u^*_j(t)]\Delta\tau \tag{67}$$

$$\lambda^*_N(t)=\phi_x^T[x^*_N(t)] \tag{68}$$

H is Hamiltonian defined by a formula (69).

$$H(x, \lambda, u)=L(x,u)+\lambda^T g(x,u)+\rho^T C(x,u) \tag{69}$$

A vector U that integrates sequence of manipulated variables as unknown variables is defined as follows:

$$U(t)[u_0^{*T}(t)\ u_1^{*T}(t)\ \ldots\ u_N^{*T}(t)]^T \in R^{mN} \tag{70}$$

When $U(t)$ and $x(t)$ are given, the formula (66) is deemed as an equation relating to $x(t)$ and $U(t)$, such as a formula (71).

$$G[U(t), x(t), (t)] = \begin{bmatrix} H_u^T[x_0^*(t), \lambda_1^*(t), u_0^*(t)] \\ H_u^T[x_1^*(t), \lambda_2^*(t), u_1^*(t)] \\ \vdots \\ H_u^T[x_{N-1}^*(t), \lambda_N^*(t), u_{N-1}^*(t)] \end{bmatrix} = 0 \tag{71}$$

To update $U(t)$ for G $(U, x, t)$ to converge to zero, a formula (72) is defined.

$$\dot{G}(U,x,t)=-\zeta G(U,x,t) \tag{72}$$

where:

$\zeta$=positive real number

If Jacobian Gu is regular, then a differential equation of a formula (73) is integrated, thereby updating $U(t)$.

$$\dot{U}=G_U^{-1}(-\zeta G - G_x \dot{x} - G_t) \tag{73}$$

Then, a product of the vectors W and w and the real number $\omega$ represented by formulae (74) to (76) are approximated using a forward difference as represented by a formula (77).

$$W \in R^{mN} \tag{74}$$

$$w \in R^{m'} \tag{75}$$

$$\omega \in R \tag{76}$$

$$G_u(U, x, t)W + G_x(U, x, t)w +$$
$$G_t(U, x, t)\omega \simeq D_\beta G(U, x, t: W, w, \omega)$$
$$= \frac{G(U + \beta W, x + \beta w, t + \beta \omega) - G(U, x, t)}{\beta}$$

where:

$\beta$=positive real number

The formula (72) is approximated by a formula (78) which is equivalent to a formula (79).

$$D_\beta G(U,x,t:U, x, 1)=-\zeta G(\dot{U}, \dot{x}, t) \tag{78}$$

$$D_\beta G(U,x+\beta \dot{x}, t+\beta \cdot \dot{U},0,0)=b(U,x,\dot{x},t) \tag{79}$$

It should be noted that b is defined in a formula (80).

$$b(U,x,\dot{x},t)=-\zeta F(U,x,t)-D_\beta G(U,x,t:0,x,1) \tag{80}$$

Figure 7:
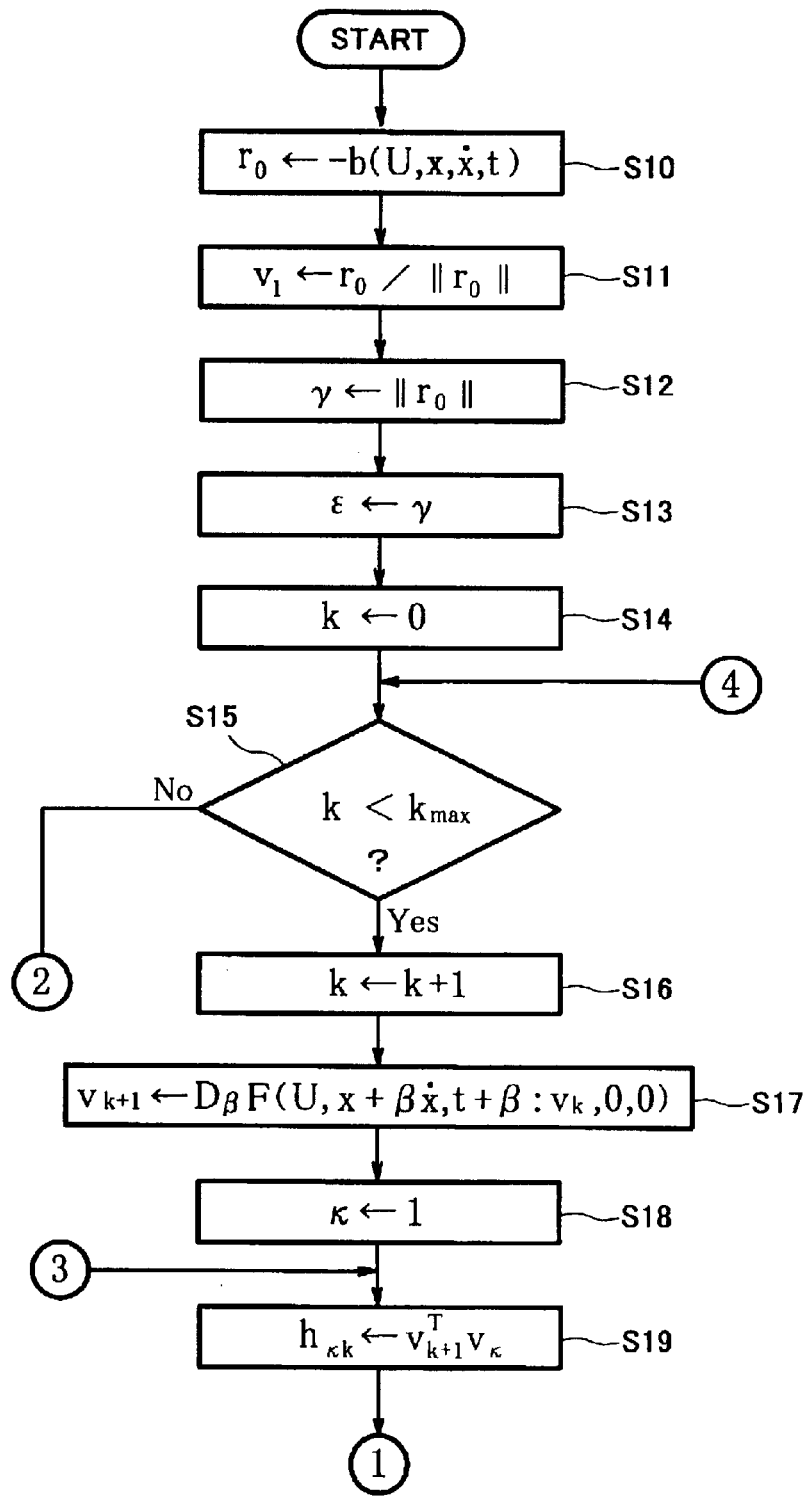
FIG. 7 is a flowchart showing an example of a procedure of the thrust allocating device according to the first embodiment.
Figure 8:
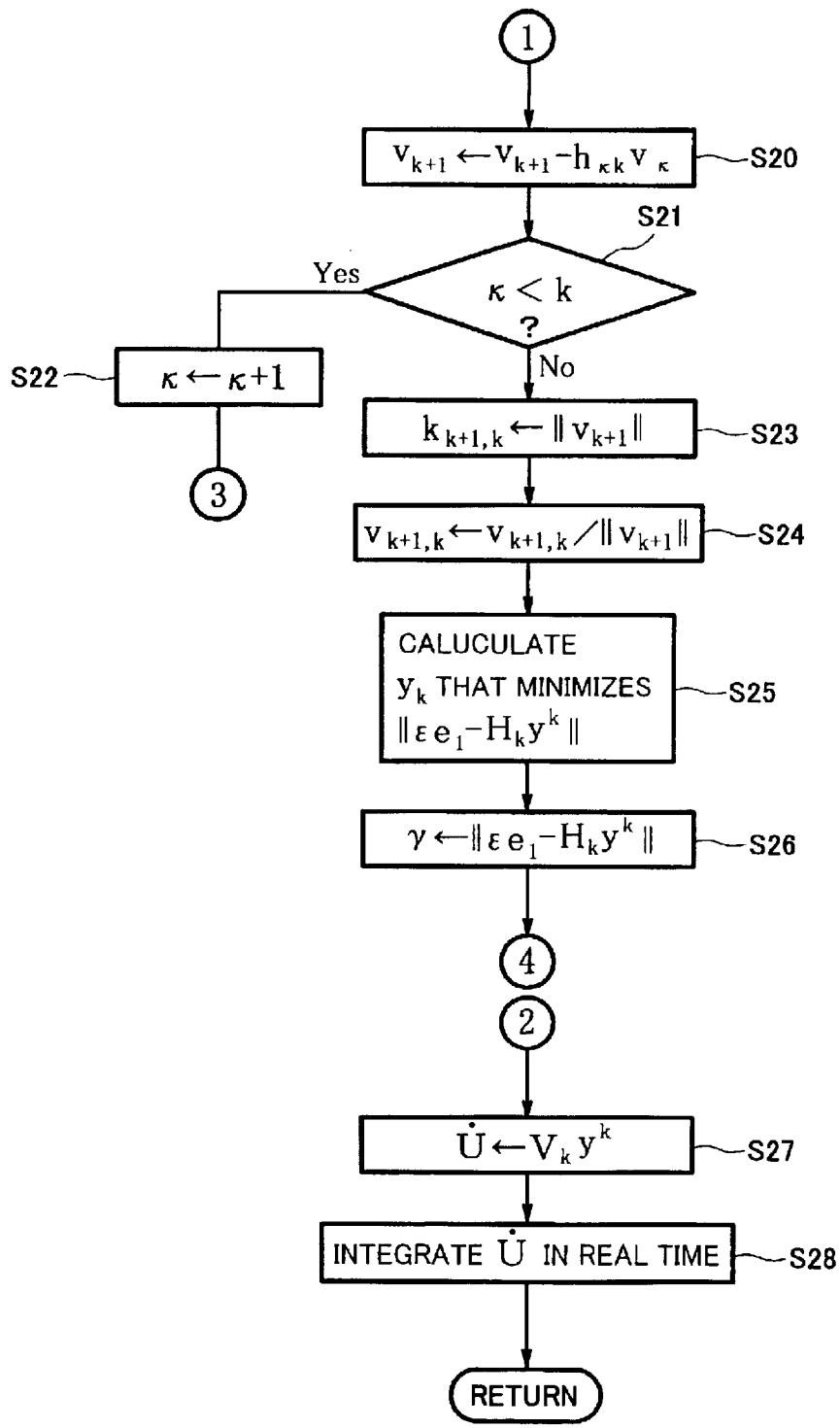
FIG. 8 is a flowchart showing another example of the procedure of the thrust allocating device according to the first embodiment.
Figure 10A:
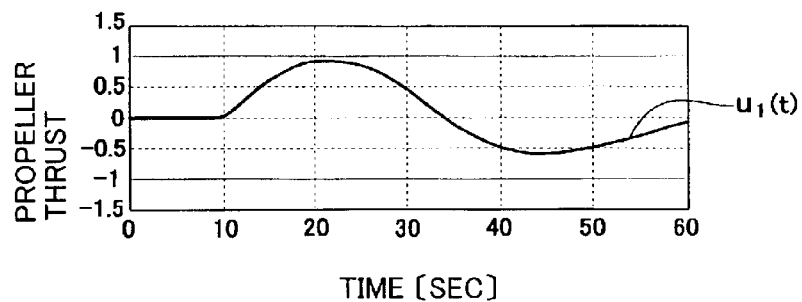
FIGS. 10A and 10B are graphs showing results of the experiment conducted on the thrust allocating device according to the first embodiment and time-series change in propeller thrusts of thrust generators.
Figure 10B:
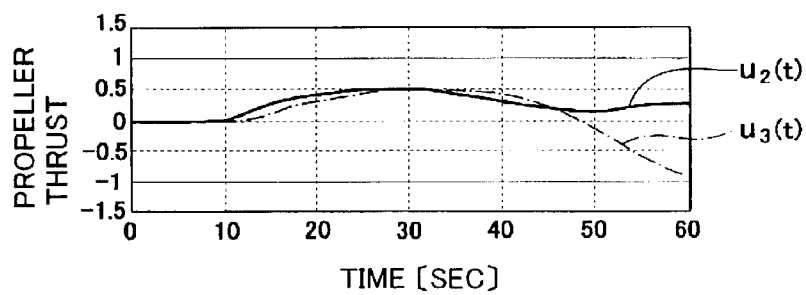
Figure 10C:
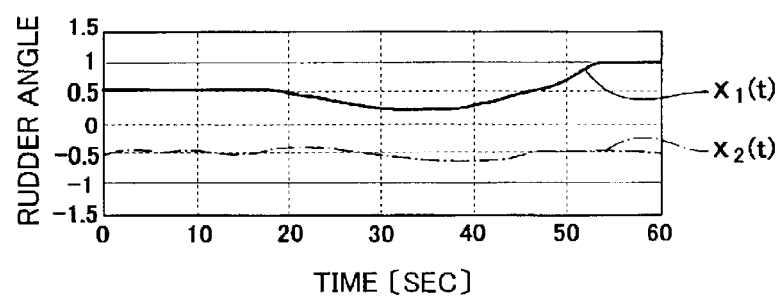
FIG. 10C is a graph showing a result of the experiment conducted on the thrust allocating device according to the first embodiment and time-series change in rudder angles of rudders.
Figure 10D:
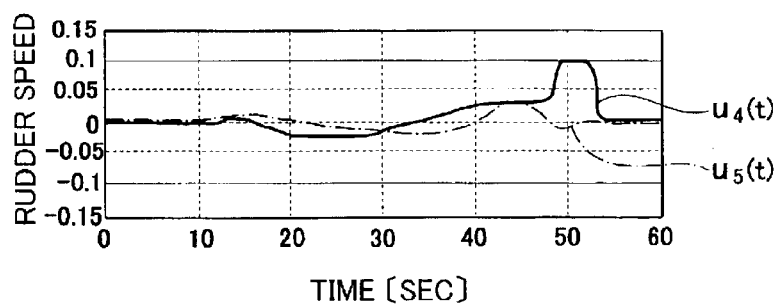
FIG. 10D is a graph showing a result of the experiment conducted on the thrust allocating device according to the first embodiment and time-series change in angular rudder speeds (rudder speeds) of the rudders.
Figure 12A:
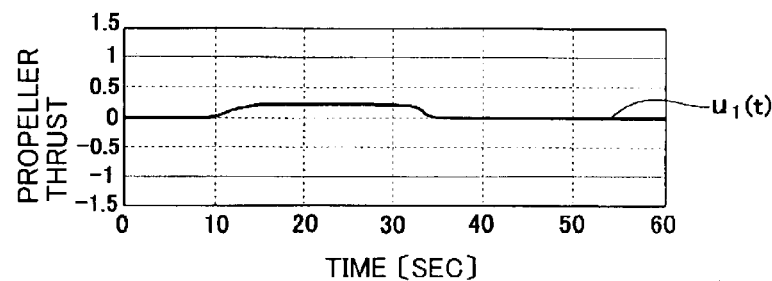
FIGS. 12A and 12B are graphs showing another results of the experiment conducted on the thrust allocating device according to the first embodiment and time-series changes in propeller thrusts of the thrust generators.
Figure 12B:
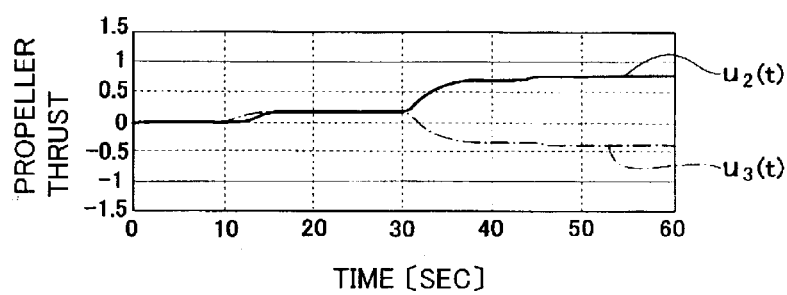
Figure 12C:
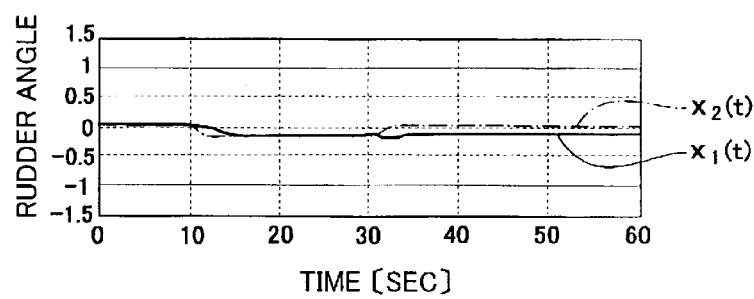
FIG. 12C is a graph showing another result of the experiment conducted on the thrust allocating device according to the first embodiment and time-series changes in rudder angles of the rudders.
Figure 12D:
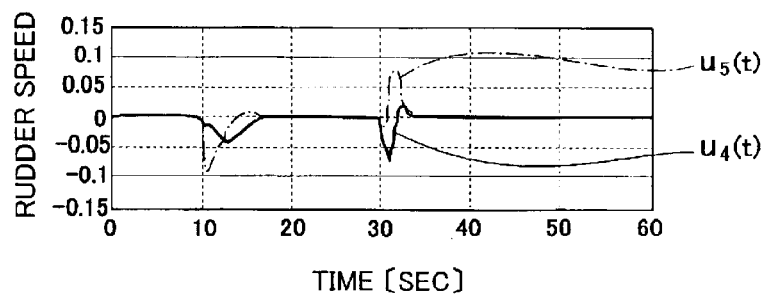
FIG. 12D is a graph showing another result of the experiment conducted on the thrust allocating device according to the first embodiment and time-series change in angular rudder speeds (rudder speeds) of the rudders.

Therefore, based on the formula (79), $U(t)$ can be calculated. Here, an example of the calculation process will be described. FIGS. 7 and 8 are flowcharts showing the example of a procedure of the thrust calculation process. Referring to FIGS. 7 and 8, first of all, the CPU 51 substitutes −b (U, x, dot x, t) in a variable $r_0$ (Step S10). Then, the CPU 51 substitutes $r_0/\|r0\|$ in a variable $v_1$ (Step S11) and substitutes a norm $\|r0\|$ into a variable $\gamma$ (Step S12). Further, the CPU 51 substitutes $\gamma$ in a variable $\epsilon$ (Step S13) and sets a counter k to zero (Step S14).

Subsequently, the CPU 51 judges whether or not k is larger than a predetermined positive integer $k_{max}$ representing the number of times inverse matrix calculation is repeated (Step S15).

When judging that $k<k_{max}$ is satisfied in Step S15, the CPU 51 increments k by one (Step S16). The CPU 51 substitutes $D_\beta G(U, x+\beta$ dot $x, t+\beta: v_k, 0, 0)$ in $v_{k+1}$ (Step S17).

The CPU 51 sets the counter k to 1 (Step S18) and substitutes $v_{k+1}^T v_K$ in a variable $h_K k$ (Step S19). In addition, the CPU 51 updates $v_{k+1}$ into $v_{k+1} - h_K k \, v_K$ (Step S20).

The CPU 51 judges whether or not K<k is satisfied (Step S21). When judging that K<k is satisfied, the CPU 51 increments K by one (Step S22) and moves the process to Step S19.

When judging that K≧k, the CPU 51 substitutes the norm $\|v_{k+1}\|$ in variable $h_{k+1, k}$ (step S23) and updates $v_{k+1}$ into $v_{k+1}/\|v_{k+1}\|$(Step S24).

Then, the CPU 51 calculates $y^k$ that minimizes $\|\epsilon e1 - H_k Y^k\|$ for $e_1$ and $H_k$ represented by formulae (81) and (82) (Step S25). It should be appreciated that $y^k$ is a vector represented by a formula (83).

$$e_1 = [1\ 0\ \ldots\ 0]^T \in R^{k+1} \tag{81}$$

$$H_k = (h_{ij}) \in R^{(k+1) \times k} \tag{82}$$

where when i>j+1, $h_{ij}$=zero.

$$Y^k \in R^k \tag{83}$$

The CPU 51 updates $\gamma$ into $\|\epsilon e1 - H_k Y^k\|$ (Step S26) and returns the process to Step S15. In Step S15, when $k \geq k_{max}$, the CPU 51 sets the dot U to $V_{ky}^k$ (Step S27). It should be noted that $V_k$ is a vector represented by a formula (84).

$$V_k = [v_1\ \ldots\ v_k] \in R^{mN \times k} \tag{84}$$

The CPU 51 integrates the dot U on line to calculate U (Step S28) and returns.

The inventors or the like loaded a computer program that simulates thrust allocation using the above thrust calculation algorithm in a computer and simulated thrust allocation. FIG. 9A is a table showing set values of parameters used in this simulation and FIG. 9B is a table showing set values of coefficients used in this simulation. As shown in FIG. 9A, in this experiment, a sampling period was set to 0.1 second and $\zeta$ was set to 10.0. $k_1$ in the formula (27) and $k_2$ in the formula (28) were each set to 50.0. The evaluation interval T was set to 0.2 second and the constant $\alpha$ for restricting the neutral point of the rudder angle was set to 0.5. The number of times the inverse matrix calculation $k_{max}$ repeats was set to 20 and the number of division N of the evaluation interval T was set to 2.

As shown in FIG. 9B, in this experiment, the weighting factors $r_1$ to $r_5$ were set to 0.1, 1.0, 1.0, 0.1, and 0.1 and weighting factors $S_{f1}$ and $S_{f2}$ were each set to 0.001. The weighting factors $q_1$ and $q_2$ were each set to 0.1, a coefficient $q_p$ was set to 1000 and $\delta$ was set to 0.02.

In this experiment, the longitudinal component and lateral component of the targeted thrust of the ship 10 and the targeted thrust moment in the turning direction of the ship 10 were changed for 60 seconds, and under the condition, the propeller thrusts $u_1(t)$ to $u_3(t)$ of the thrust generators 1 to 3 and the rudder angles $x_1(t)$ and $x_2(t)$ and the rudder speeds $u_4(t)$ and $u_5(t)$ of the rudders 22 and 32 were calculated. From the calculated values $u_1(t)$ to $u_5(t)$ and $x_1(t)$ and $x_2(t)$, the longitudinal component and lateral component of the thrust of the entire ship 10 and the thrust moment in the turning direction of the ship 10 were calculated and compared to the corresponding targeted values. Further, as an indicator indicating how the calculated values $u_1(t)$ to $u_5(t)$ and the $x_1(t)$ and $x_2(t)$ derived from the thrust calculation process in FIGS. 7 and 8 satisfy the Euler Lagrange formula (16), an error of optimality that becomes larger as these values are farther from numeric values that satisfy the formula (16) is obtained.

FIGS. 10 and 11 are graphs showing an example of experimental results. FIG. 10A is a graph showing time-series change in the propeller thrust $u_1(t)$ of the thrust generator 1 and FIG. 10B is a graph showing time-series change in the propeller thrusts $u_2(t)$ and $u_3(t)$ of the thrust generators 2 and 3. In FIG. 10B, a solid line represents change in the propeller thrust $u_2(t)$ and a dashed line represents change in the propeller thrust $u_3(t)$. FIG. 10C is a graph showing time-series change in the rudder angles $x_1(t)$ and $x_2(t)$ of the rudders 22 and 32 and FIG. 10D is a graph showing time-series change in the rudder speeds $u_4(t)$ and $u_5(t)$. In FIG. 10C, a solid line represents change in the rudder angle $x_1(t)$ and a dashed line represents change in the rudder angle $x_2(t)$. In FIG. 10D, a solid line represents change in the rudder speed $u_4(t)$ and a dashed line represents change in the rudder speed $u_5(t)$.

FIG. 11A is a graph showing time-series change in the longitudinal component of the thrust of the entire ship 10. FIG. 11B is a graph showing time-series change in the lateral component of the thrust of the entire ship 10. FIG. 11C is a graph showing time-series change in the thrust moment in the turning direction of the ship 10. FIG. 11D is a graph showing time-series change in the total errors in the thrust calculation process. In FIGS. 11A to 11C, solid lines represent time series changes in the longitudinal component and lateral component of the thrust of the ship 10 and the thrust moment in the turning direction of the ship 10 when the thrust generators 1 to 3 operate at $u_1(t)$ to $u_5(t)$ and $x_1(t)$ and $x_2(t)$ and dashed lines represent time series change in the longitudinal component and lateral component of the targeted thrust and the time series change in the targeted thrust moment in the turning direction of the ship 10.

As shown in FIGS. 11A to 11C, the longitudinal component and lateral component of the targeted thrust and the targeted thrust moment in the turning direction varied in the form of a sine wave with different cycles. As can be seen from $\alpha$=0.5, the V-shape rudder has a rudder angle of 50% with respect to a maximum rudder angle.

This resulted in the thrust and thrust moment which approximately coincided with the targeted values. In addition, the total errors in the thrust calculation process was controlled to be small.

FIGS. 12A to 12C and FIGS. 13A to 13C are graphs showing another examples of this experiment. As can be seen from FIGS. 13A to 13C, simulation was conducted under the condition in which the longitudinal component and lateral component of the targeted thrust were given as 0.2 in 10 seconds after start of simulation and failure occurred in the thrust generator 1 in 30 seconds after start of the simulation. After detection of occurrence of failure, the weighting factor $r_1$ of the thrust generator 1 was changed from 0.1 to 1000.

As a result, in 30 seconds after start of simulation, which corresponds to the occurrence point of the thrust generator 1, $u_1(t)$ changed from about 0.2 to 0, $u_2(t)$ changed from about 0.2 to about 0.7, and $u_3(t)$ was changed from about 0.2 to about −0.4. The rudder angles $x_1(t)$ and $x_2(t)$ slightly changed from that point.

In 30 seconds after start of the simulation, the thrust and thrust moment that almost coincided with the targeted values were obtained although the longitudinal component of the thrust of the entire ship 10 was somewhat far from the targeted value. In this case, the total errors in the thrust calculation process increased temporarily around an elapse of 30 seconds after start of the simulation but decreased thereafter.

As should be appreciated, by using the thrust allocating method according to the present invention, appropriate thrust allocation can continue even when failure occurs in the thrust generator.

In this experiment, a personal computer having a standard configuration, was used. It took only about 4 seconds to calculate $u_1(t)$ to $u_5(t)$ and $x_1(t)$ and $x_2(t)$ over 60 seconds. From this fact, it is revealed that thrust allocation is satisfactorily performed on line by using the thrust calculating method according to the first embodiment.

Embodiment 2

Figure 14:
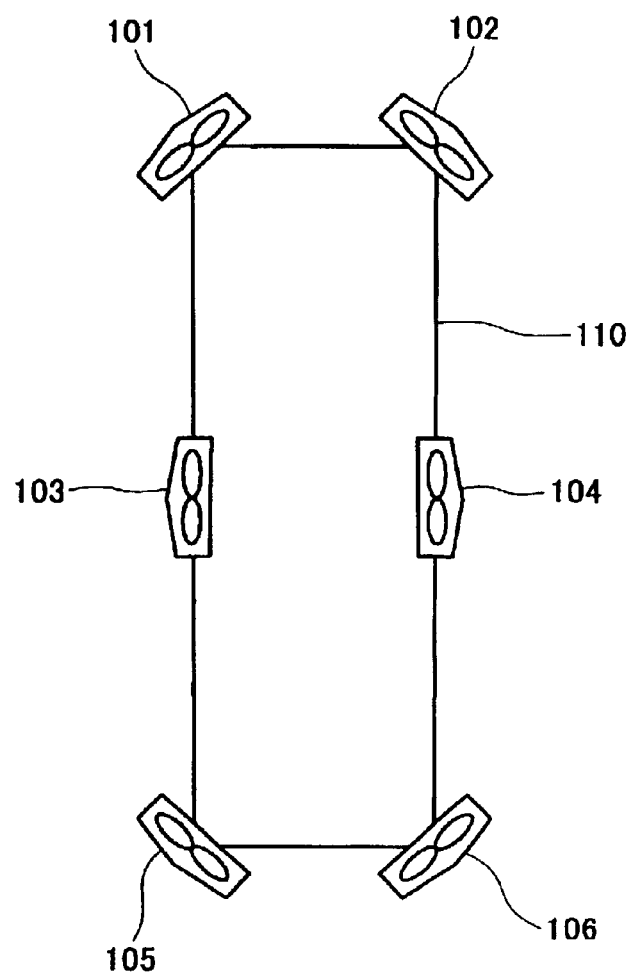
FIG. 14 is a schematic plan view showing an example of a construction of a ship equipped with a thrust allocating device according to a second embodiment of the present invention.

FIG. 14 is a schematic view showing an example of a construction of ship equipped with a thrust allocating device according to a second embodiment of the present invention. As shown in FIG. 14, a ship 110 is equipped with thrust generators 101 to 106. The thrust generators 101 to 106 are turnable thrust generators, i.e., so-called azimuth thrusters. The thrust generators 101 to 106 are each turnable to change the direction in which the thrust is generated.

As shown in FIG. 14, the thrust generators 101 to 106 are provided at right and left ends of a front portion, a center portion, and a rear portion of the ship 10, but the number and arrangement of thrust generators are not limited to this. Hereinafter, a description will be given of a case where turnable thrust generators with an arbitrary number are arranged at arbitrary positions of the ship 10.

Figure 15:
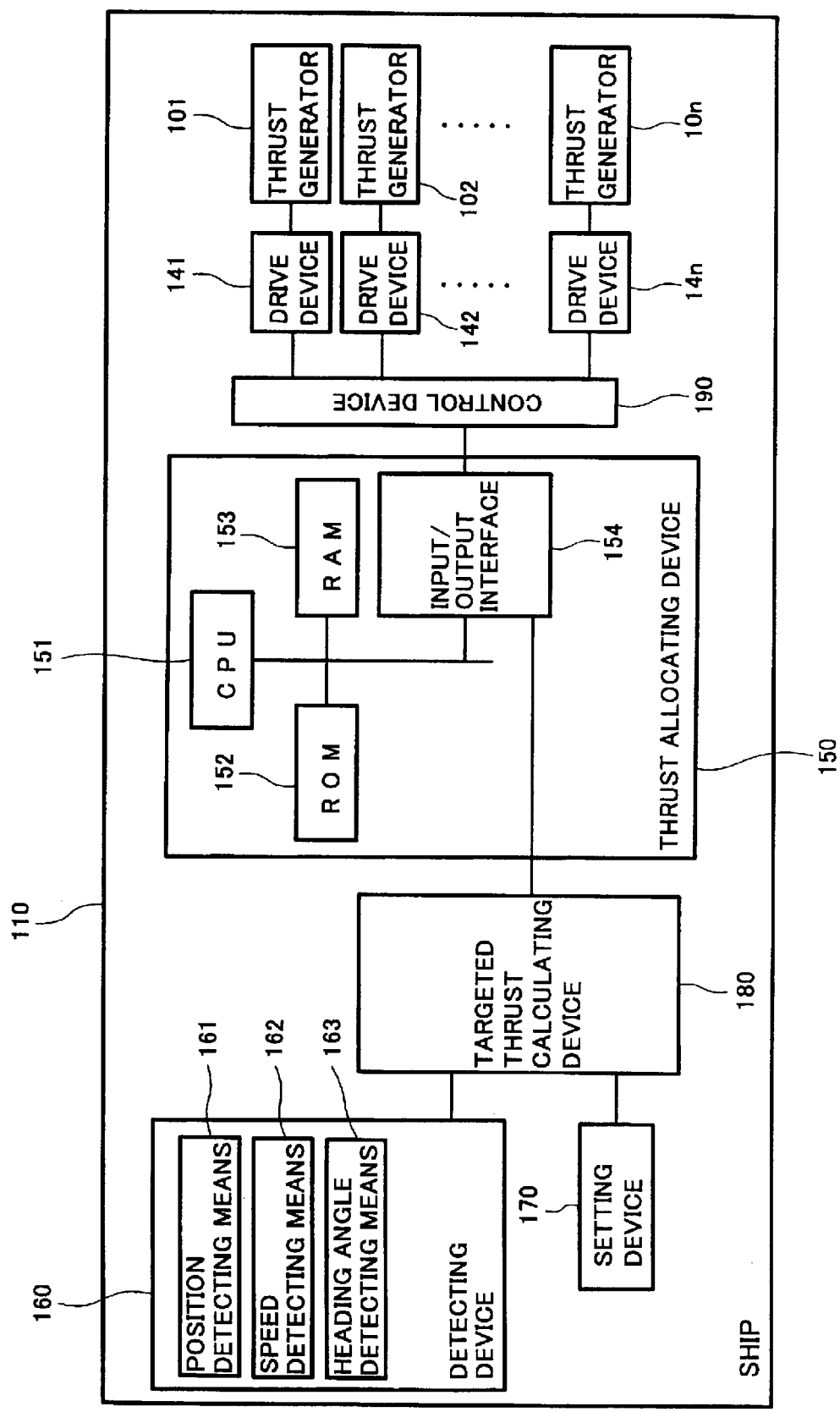
FIG. 15 is a block diagram showing the construction of the ship equipped with the thrust allocating device according to the second embodiment.

FIG. 15 is a block diagram showing a construction of the ship 110 equipped with the thrust allocating device according to the second embodiment. Here, it is assumed that the ship 110 has n turnable thrust generators 101 to 101n. As shown in FIG. 15, the ship 110 comprises the n thrust generators 101 to 101n, drive devices 141 to 14n, a thrust allocating device 150, a detecting device 160, a setting device 170, a targeted thrust calculating device 180 and a control device 190.

The drive devices 141 to 14n are connected to the thrust generators 101 to 10n, respectively. The drive devices 141 to 14n are each comprised of an engine, a transmission, a hydraulic unit, and so forth. The drive devices 141 to 14n are configured to drive propellers of the turnable thrust generators 101 to 10n to rotate at desired rotation speeds and the thrust generators 101 to 10n to turn by desired angles.

The detecting device 160 has a position detecting means 161, a speed detecting means 162, and a heading angle detecting means 163 having configurations similar to those of the position detecting means 61, the speed detecting means 62, and the heading angle detecting means 63 in the first embodiment.

The configurations of the setting device 170 and the targeted thrust calculating device 180 are similar to those of the setting device 7 and the targeted thrust calculating device 8 which have been described in the first embodiment, and will not further be described.

The thrust allocating device 150 is comprised of a CPU 151, a ROM 152, a RAM 153, and an input/output interface 154. The input/output interface 154 is connected to the targeted thrust calculating device 180 to receive data from the targeted thrust calculating device 180. Based on the longitudinal component and lateral component of the targeted thrust and the targeted thrust moment in the turning direction which are input from the targeted thrust calculating device 180, the thrust allocating device 150 is configured to calculate propeller thrusts and turning angles of the thrust generators 101 to 10n. The input/output interface 154 is connected to the control device 190 to transmit data thereto. The thrust allocating device 150 is configured to output the calculated propeller thrusts and turning angles to the control device 190 via the input/output interface 154.

The control device 190 is connected to the drive devices 141 to 14n. The ship 110 is provided with rotation speed sensors for detecting rotation speeds of the propellers of the thrust generators 101 to 10n and turning angle sensors for detecting turning angles of the thrust generators 101 to 10n. The rotation speed sensors and the turning angle sensors are connected to the control device 190 to output the detected rotation speeds and turning angles to the control device 190.

The control device 190 is comprised of a CPU, a ROM, a RAM and so forth. The control device 190 is configured to control the propeller thrusts and turning angles of the thrust generators 101 to 10n using, for example, PID control so that the propeller thrusts and turning angles substantially conform to the propeller thrusts and turning angles which are output from the thrust allocating device 150, based on the propeller thrusts and turning angles input from the thrust allocating device 150 and the current propeller rotation speeds and turning angles which are input from the sensors. The control device 190 is configured to output control signals to the drive devices 141 to 14n, which drive the thrust generators 101 to 10n.

Further, the control device 190 is configured to judge whether or not the propeller thrusts and rudder angles of the thrust generators 101 to 10n which are measured by the sensors substantially conform to the propeller thrusts and turning angles which are input from the thrust allocating device 150. When judging that any of these does not conform to the corresponding one, the control device 9 judges that failure has occurred in the corresponding thrust generator, and outputs information indicative of occurrence of the failure to the thrust allocating device 150.

Figure 16:
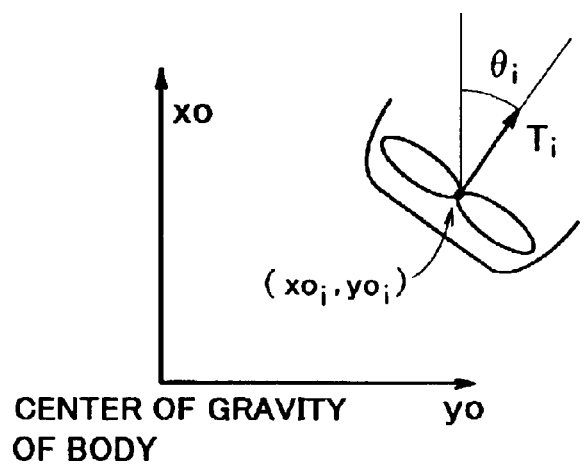
FIG. 16 is a schematic view showing a position and a turning angle of a turnable thrust generator.

Subsequently, an outline of a thrust calculation algorithm of a program executed by the thrust allocating device 150 will be described. FIG. 16 is a schematic view showing a position and a turning angle of the turnable thrust generator. As shown in FIG. 16, on a body fixed horizontal coordinate system xo-yo (bow axis xo and right axis yo) with a center of gravity of the body as an origin, a position of an i-th turnable thrust generator 10i is represented by $(xo_i, yo_i)$, the propeller thrust is represented by Ti, and a turning angle with respect to the xo axis is represented by $\theta_i$. In this system, a longitudinal component X and a lateral component Y of the thrust generated by the n thrust generators and a thrust moment in a turning direction are given by the formulae (8), (9), and (10).

$$\sum_{i=1}^{n} T_i \cos\theta_i = X \tag{8}$$

-continued $$\sum_{i=1}^{n} T_i \sin\theta_i = Y \quad (9)$$

$$\sum_{i=1}^{n} T_i(-yo_i \cos\theta_i + xo_i \sin\theta_i) = N \quad (10)$$

Here, state variable vectors of the turnable thrust generator are represented by x=$[T_1, T_2, \ldots, T_n, \theta_1, \theta_2, \theta_n]^T$ and manipulated variables u to be given to the turnable thrust generators 101 to 10n by the control device 190 are represented by u=dx/dt. Scalar value functions Φ, L that define the performance index represented by the formula (11) are defined by formulae (85) and (86), respectively.

$$\phi = \sum_{j=1}^{n} \frac{1}{2} sf_j(x_j - xr_j)^2 + \quad (85)$$

$$\frac{1}{2} sw_X(X - Xr)^2 + \frac{1}{2} sw_Y(Y - Yr)^2 + \frac{1}{2} sw_N(N - Nr)^2$$

$$L = \sum_{j=1}^{2n} \frac{1}{2} r_j u_j^2 \quad (86)$$

where:
- $xr_j$=a targeted value of a j-th state variable
- Xr=a body longitudinal component of a targeted thrust of the ship 110 given by the targeted thrust calculating device 180
- Yr=a body lateral component of a targeted thrust of the ship 110 given by the targeted thrust calculating device 180
- Nr=a targeted thrust moment in a turning direction of the ship 110 given by the targeted thrust calculating device 180
- $sf_j$, $sw_X$, $sw_Y$, $sw_N$, $r_j$=weighting factors The manipulated variable u and the state variable X are limited as represented by formulae (87) and (88).

$$u_{Lj} \leq u_j \leq u_{Hj}, j=1, \ldots, 2n \quad (87)$$

$$x_{Lj} \leq x_j \leq x_{Hj}, j=1, \ldots, 2n \quad (88)$$

where:
- $u_{Lj}$=a lower limit value of a j-th manipulated variable $u_j$
- $u_{Hj}$=an upper limit value of a j-th manipulated variable $u_j$
- $x_{Lj}$=a lower limit value of a j-th state variable $x_j$
- $x_{Hj}$=an upper limit value of a j-th state variable $x_j$ When any of the thrust generators 101 to 10n should be stopped due to the failure or the like, the weighting factor $r_j$ of the corresponding manipulated variable is increased or the lower limit value $U_{Lj}$ and upper limit value $U_{Hj}$ of the corresponding manipulated variable are caused to approach zero. Under the condition, thrust allocation can be correctly performed after stop of the thrust generator.

Figure 17:
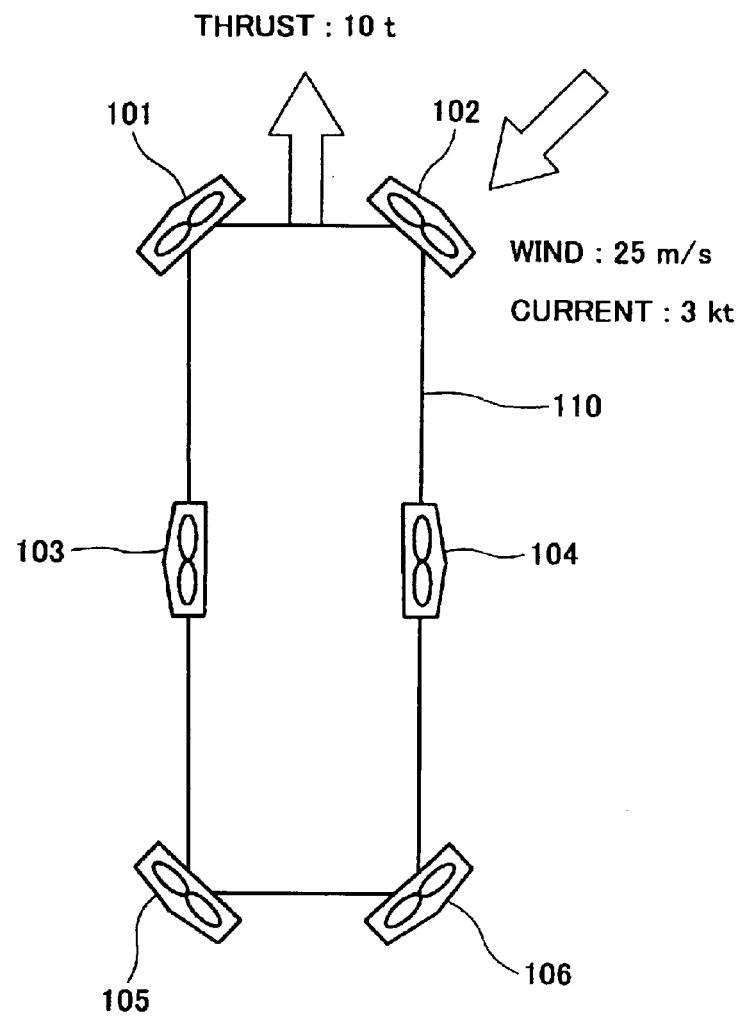
FIG. 17 is a schematic plan view showing an outline of experiment 1.

Inventors or the like loaded a computer program that simulates thrust allocation using the above-mentioned thrust calculation algorithm in the computer and simulated thrust allocation. FIG. 17 is a schematic view showing an outline of experiment 1. As shown in FIG. 17, in the experiment 1, transitions of the propeller thrusts and turning angles of the thrust generators 101 to 106 were simulated for 100 seconds under the condition in which when wind blowing at a speed of 25 m/s from obliquely rightward front toward the body (at an angle of 45 degrees with respect to the body) and a current with 3 kt in the same direction were acted on the ship 110 having the construction in FIG. 15, as disturbance, and the ship 10 generated forward thrust of 10 t.

Figure 18:
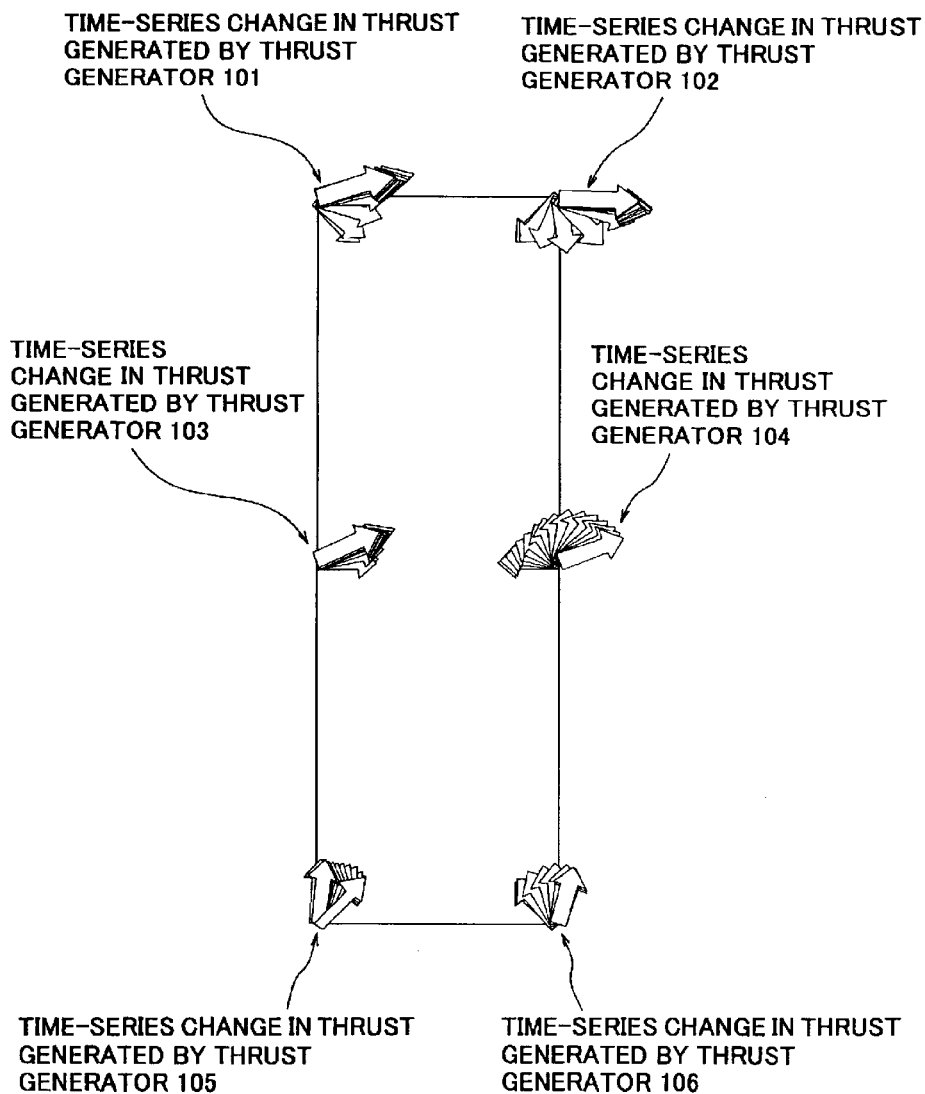
FIG. 18 is a schematic plan view showing a result of the experiment 1.
Figure 19:
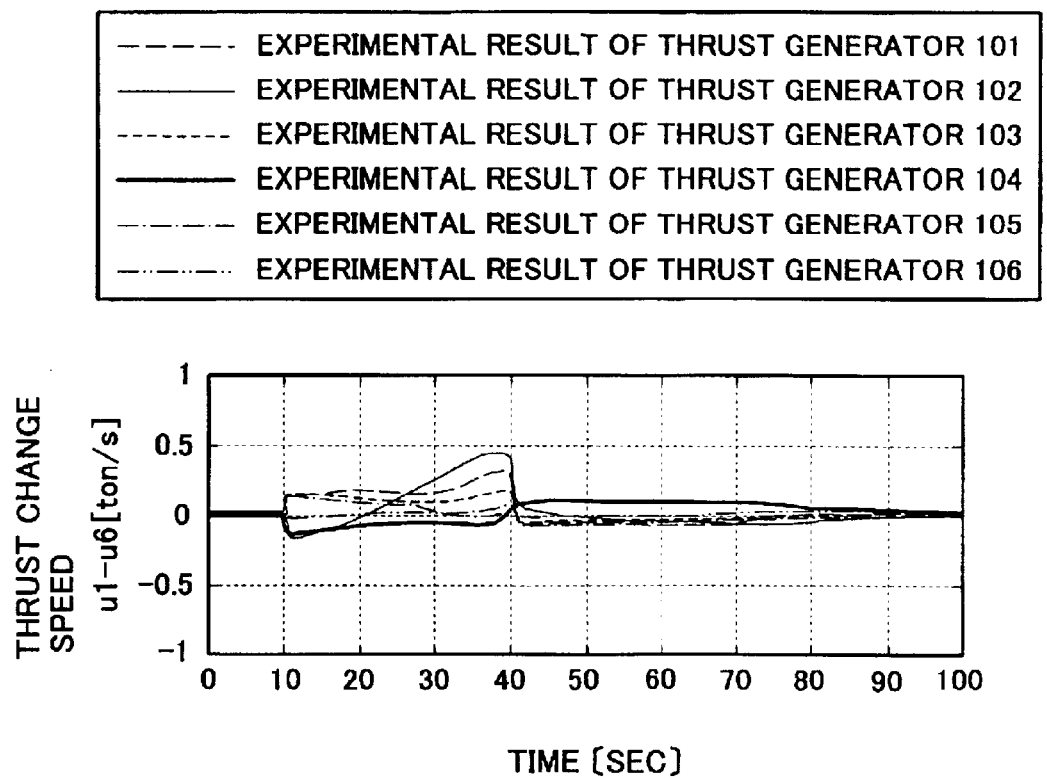
FIG. 19 is a graph showing time-series changes in change speeds of propeller thrusts of the thrust generators in the experiment 1.
Figure 20:
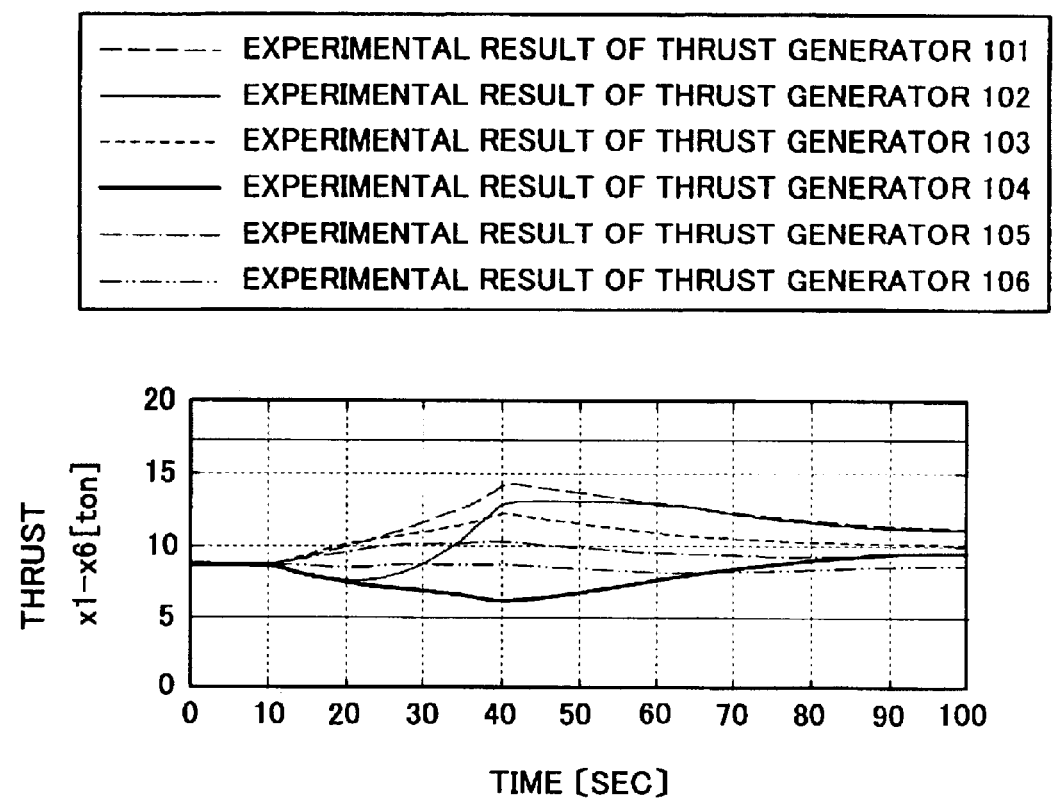
FIG. 20 is a graph showing time-series changes in the propeller thrusts of the thrust generators in the experiment 1.
Figure 21:
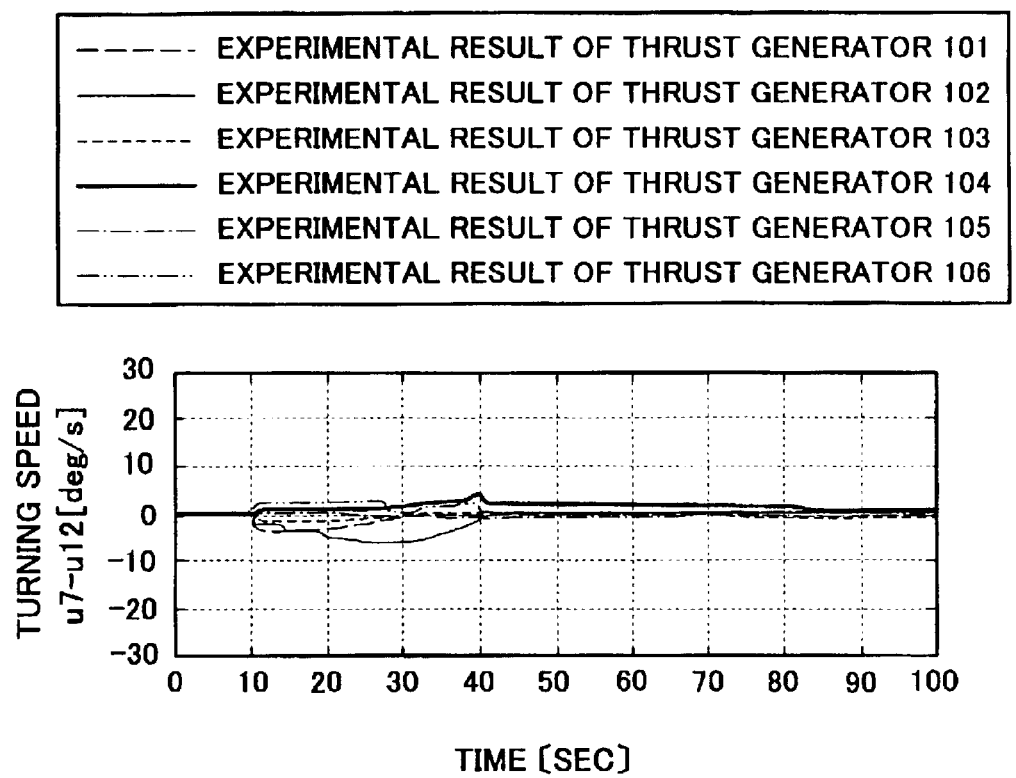
FIG. 21 is a graph showing time-series changes in angular turning speeds (turning speeds) of the thrust generators in the experiment 1.
Figure 2:
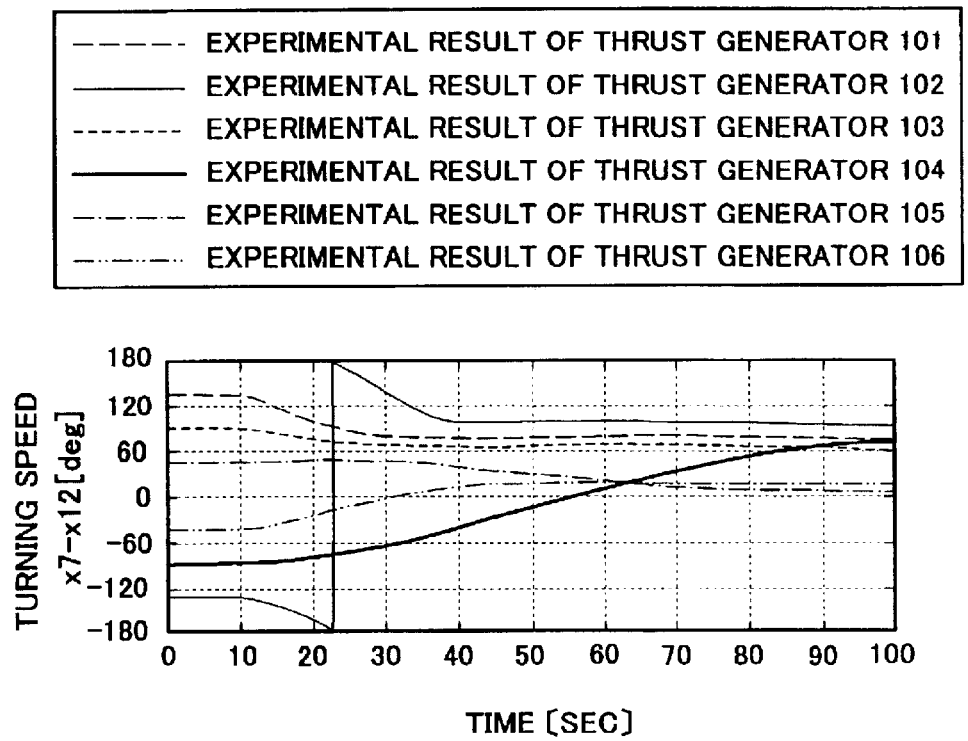
Figure 23:
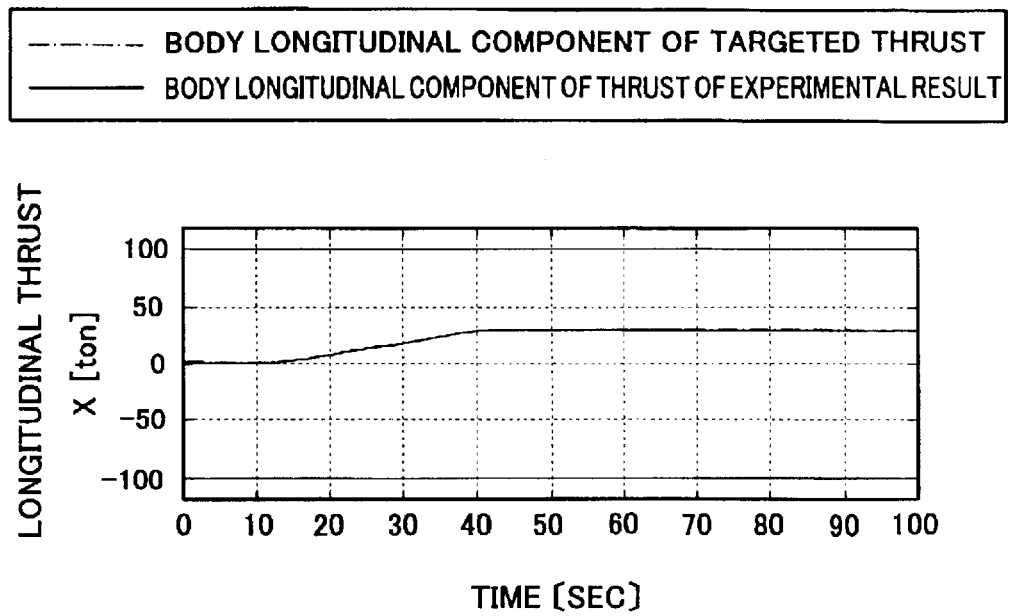
FIG. 23 is a graph showing time-series change in a longitudinal component of the thrust of the entire ship in the experiment 1.
Figure 24:
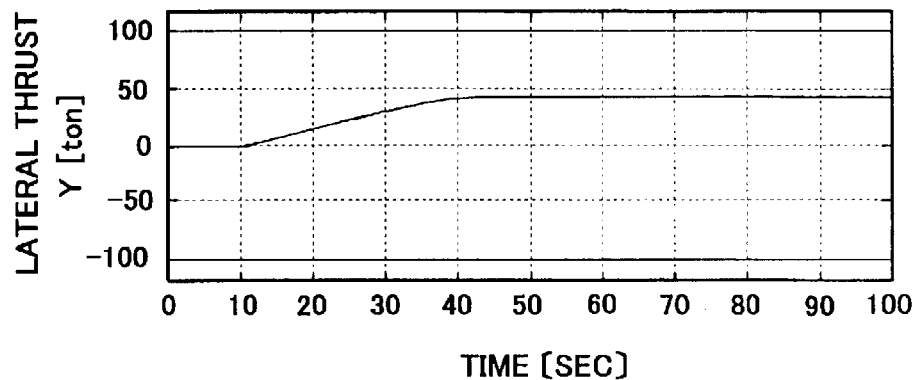
FIG. 24 is a graph showing time-series change in a lateral component of the thrust of the entire ship in the experiment 1.
Figure 25:
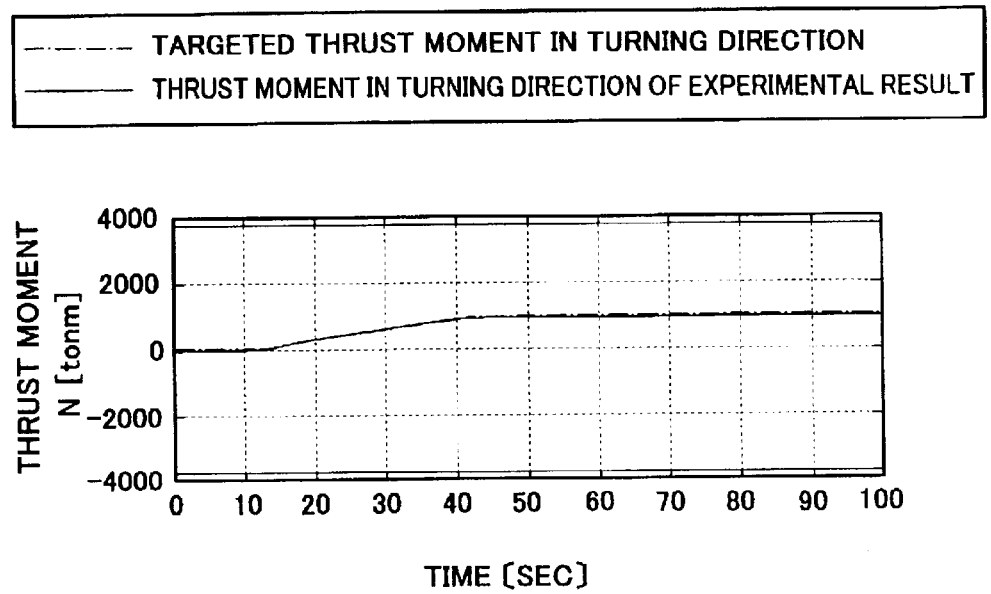
FIG. 25 is a graph showing time-series change in a thrust moment in the turning direction of the entire ship in the experiment 1.

FIG. 18 is a schematic plan view showing results of the experiment 1. FIGS. 19 to 25 are graphs showing the results of the experiment 1. FIG. 19 shows time-series change in change speeds of the propeller thrusts of the thrust generators 101 to 106, FIG. 20 shows time-series change in the propeller thrusts of the thrust generators 101 to 106, FIG. 21 shows time-series change in the angular turning speeds (turning speeds) of the thrust generators 101 to 106, FIG. 22 shows time-series change in the turning angles of the thrust generators 101 to 106, FIG. 23 shows time-series change in the longitudinal component of the thrust of the entire ship 10, FIG. 24 shows time-series change in the lateral component of the thrust of the entire ship 110, and FIG. 25 shows time-series change in the turning thrust (thrust moment in the turning direction) of the entire ship 110.

In FIG. 18, arrows represent thrusts generated by the thrust generators 101 to 106 at the corresponding positions. The directions of arrows represent the directions of the thrusts (i.e., turning angles) and the lengths of the arrows represent the magnitudes of the thrusts. Among the arrows located at the same position, upper arrow represents the thrust generated later. In FIG. 18, by drawing the arrows representing thrusts generated later on upper side with an elapse of time, the directions and magnitudes of the thrusts generated by the thrust generators 101 to 106 are illustrated.

In FIGS. 19 to 22, experimental results of the thrust generator 101 are represented by broken lines with long pitch, experimental results of the thrust generator 102 are represented by thin solid lines, experimental results of the thrust generator 103 are represented by broken lines with short pitch, experimental results of the thrust generator 104 are represented by bold solid lines, experimental results of the thrust generator 105 are represented by dashed lines, experimental results of the thrust generator 106 are represented by two dot chain lines. In the experiment 1, a maximum thrust of each of the thrust generators 101 to 106 is assumed to be 17 t and a minimum thrust is set to 30% of the maximum thrust.

As shown in FIGS. 23 to 25, the body longitudinal component of the targeted thrust of the ship 110, the body lateral component of the targeted thrust of the ship 110, and the targeted thrust moment in the turning direction of the ship 110 are represented by dashed lines, and the corresponding experimental results are represented by solid lines.

As can be seen from FIGS. 18 to 22, change speeds of the propeller thrusts, turning speeds, and turning angles of the thrust generators 101 to 106 greatly changed from 10 seconds after start of the simulation until 40 seconds after start of the simulation, and thereafter, are substantially stable.

As can be seen from FIGS. 23 to 25, the longitudinal component and lateral component of the whole thrust generated by the ship 110 and the thrust moment in the turning direction of the ship 110 gradually increase from 10 seconds after start of the simulation until 40 seconds after start of the simulation, and thereafter are substantially constant. In addition, these values substantially coincide with the corresponding targeted values. Therefore, the longitudinal component and lateral component of the thrust generated by the entire ship 110 and the thrust moment in the turning direction of the ship 110 substantially conform to given targeted values on line.

Figure 26:
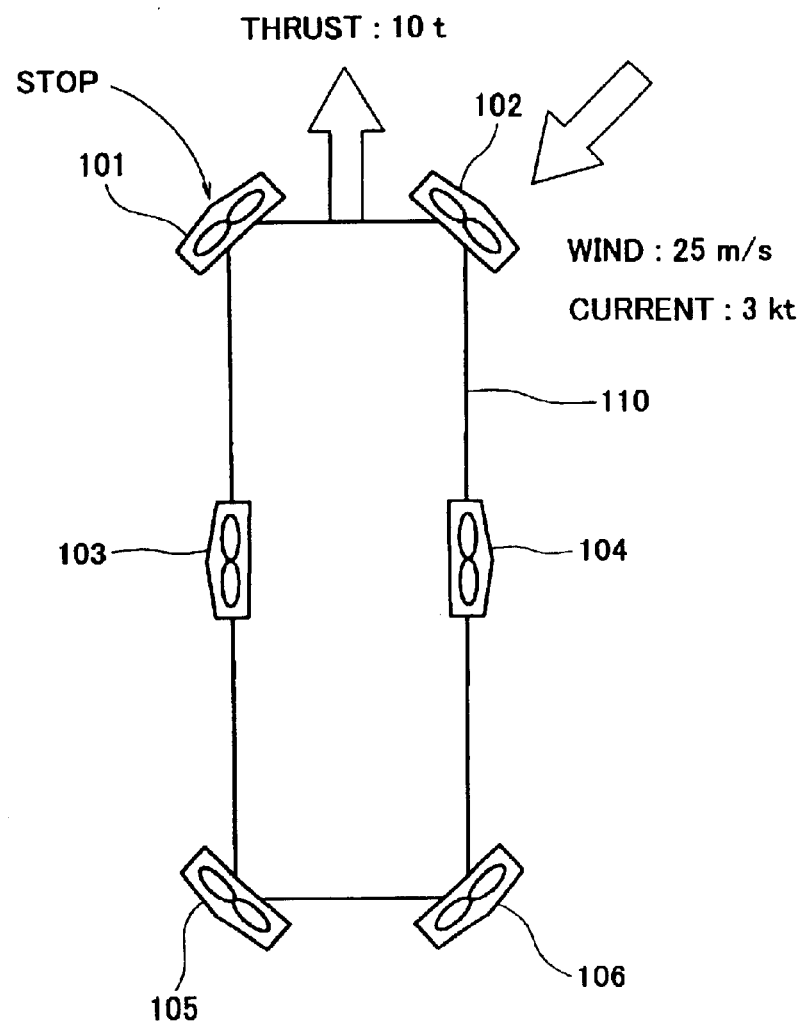
FIG. 26 is a schematic plan view for explaining an outline of an experiment 2.
Figure 2:
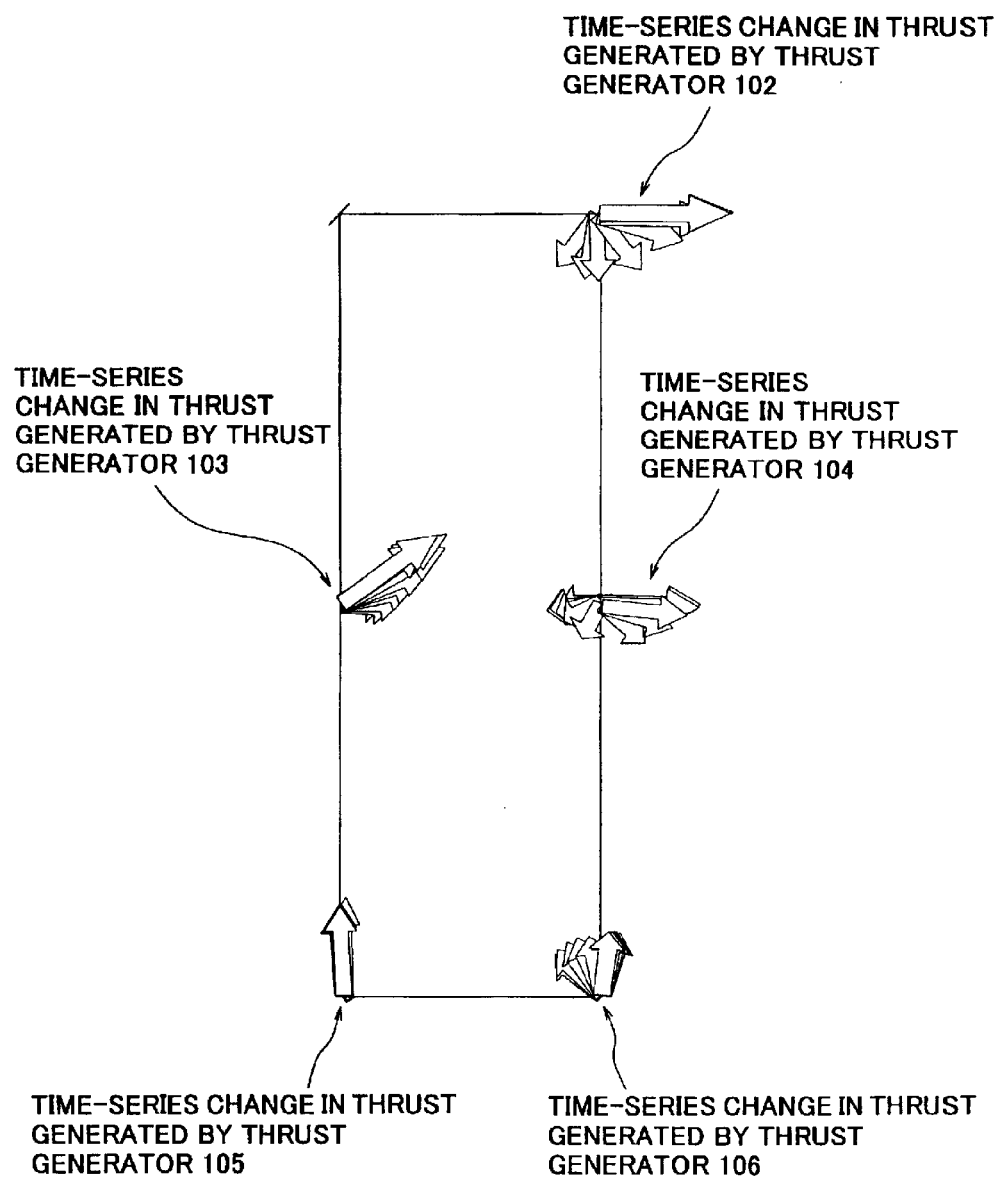

The inventors or the like conducted experiment 2 to confirm effectiveness of the thrust calculation algorithm described in the second embodiment. FIG. 26 is a schematic view showing the outline of the experiment 2. As shown in FIG. 26, in the experiment 2, assuming that failure occurred in the thrust generator 101 on the left front side of the body of the ship 110 and the thrust generator 101 was stopped under the condition used in the experiment 1, transition of the propeller thrusts and turning angles of the thrust generators 102 to 106 were simulated for 100 seconds.

Figure 28:
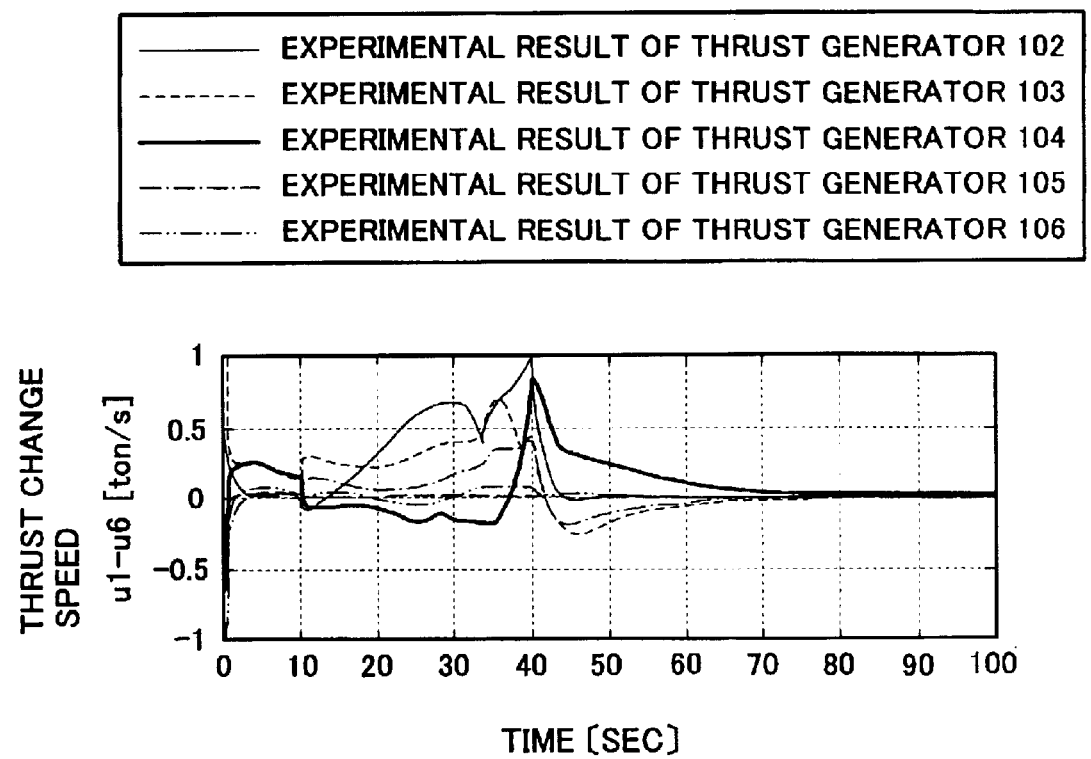
FIG. 28 is a graph showing time-series change in change speeds of propeller thrusts in the thrust generators in the experiment 2.
Figure 29:
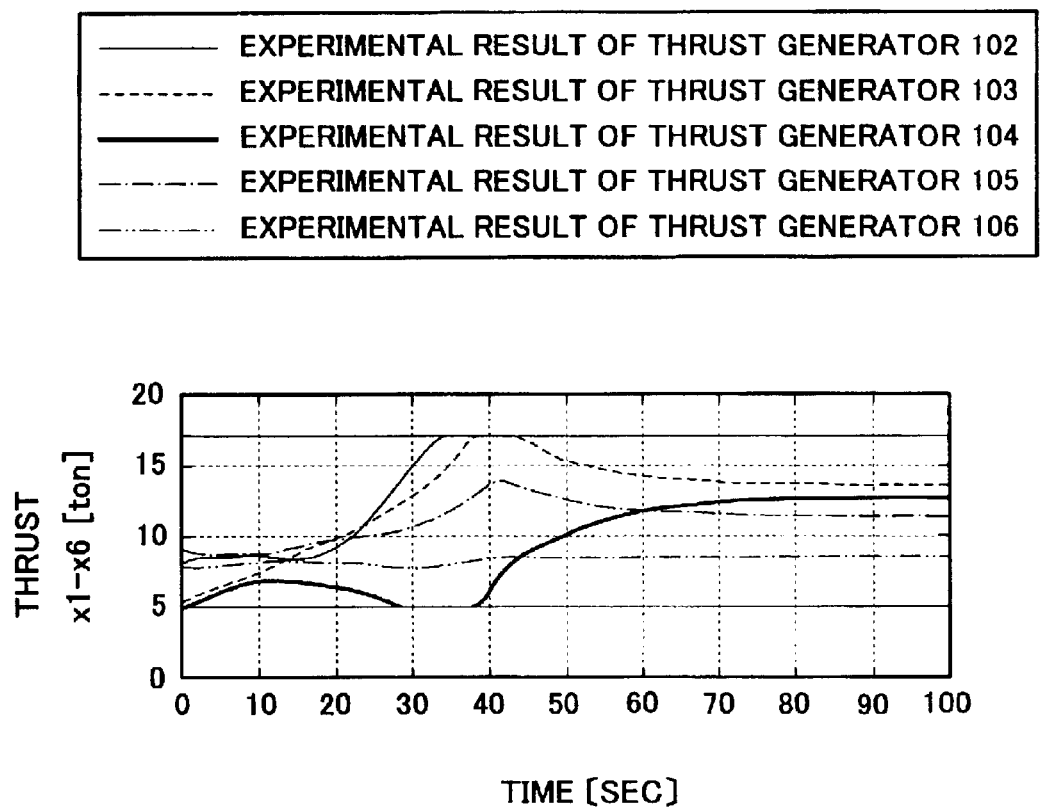
FIG. 29 is a graph showing time-series change in the propeller thrusts of the thrust generators in the experiment 2.
Figure 30:
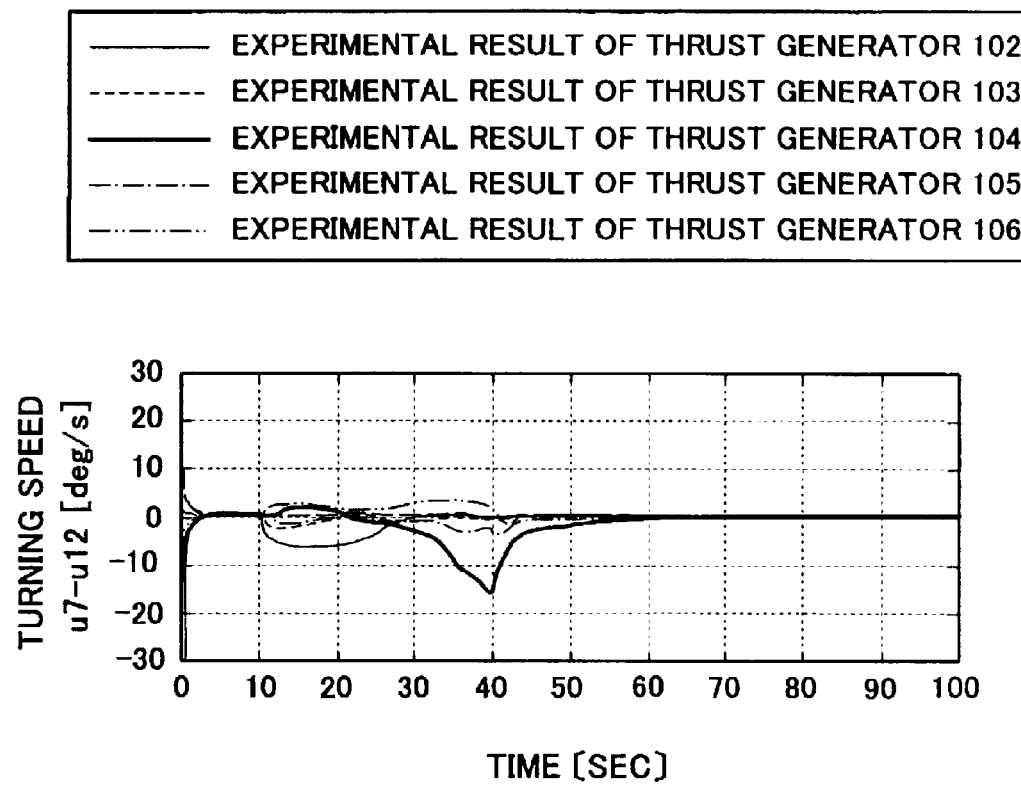
FIG. 30 is a graph showing time-series change in angular turning speeds (turning speeds) of the thrust generators in the experiment 2.
Figure 31:
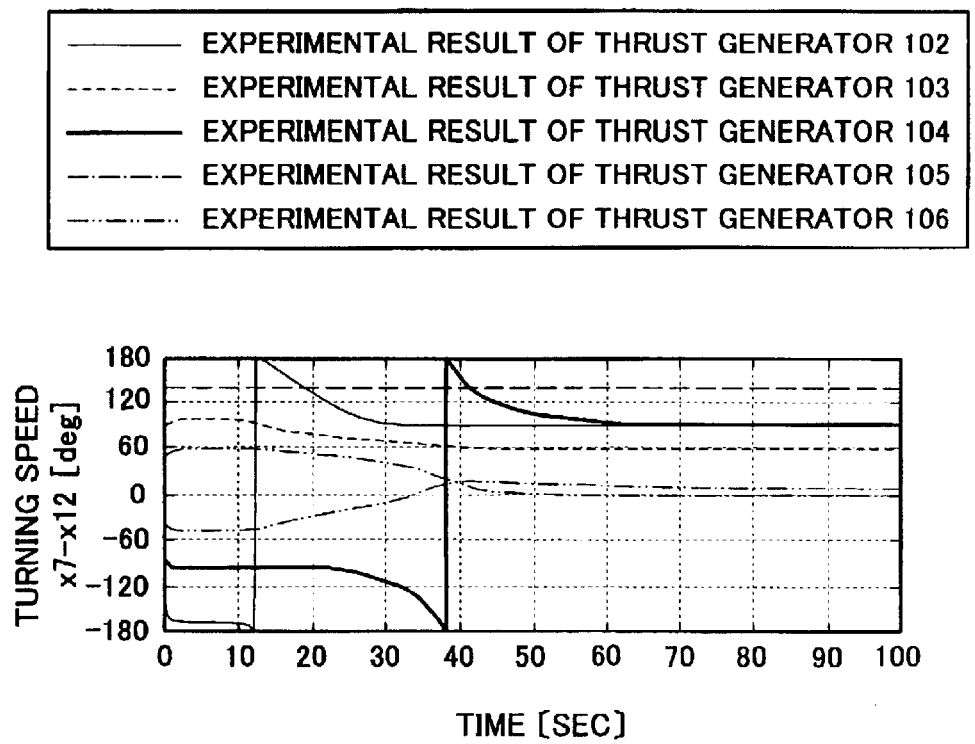
FIG. 31 is a graph showing time-series changes in turning angles of the thrust generators in the experiment 2.
Figure 3:
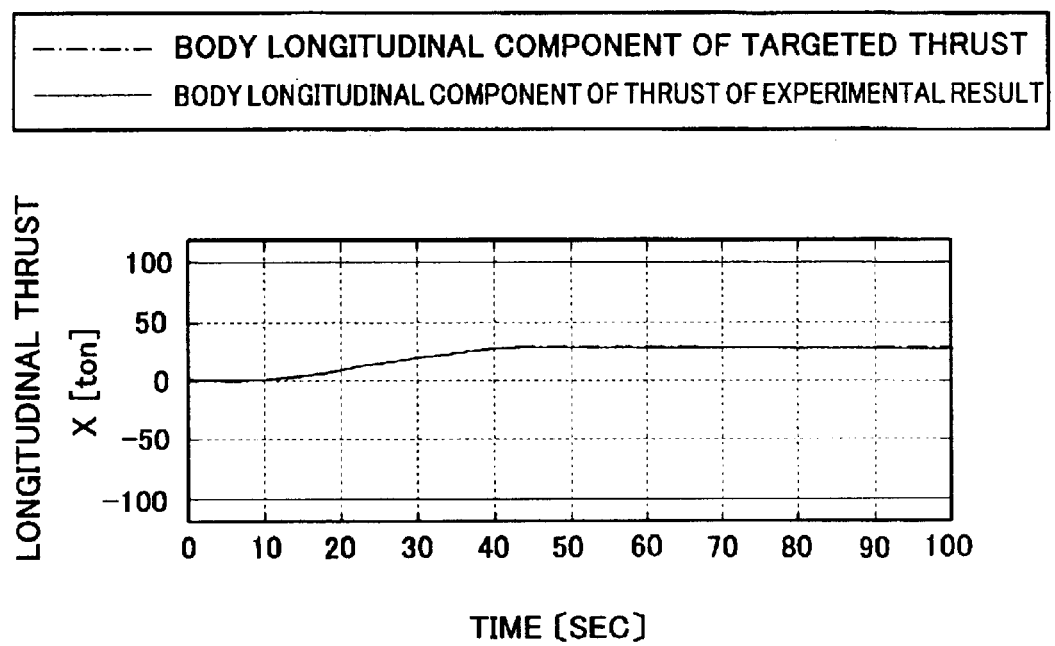
Figure 33:
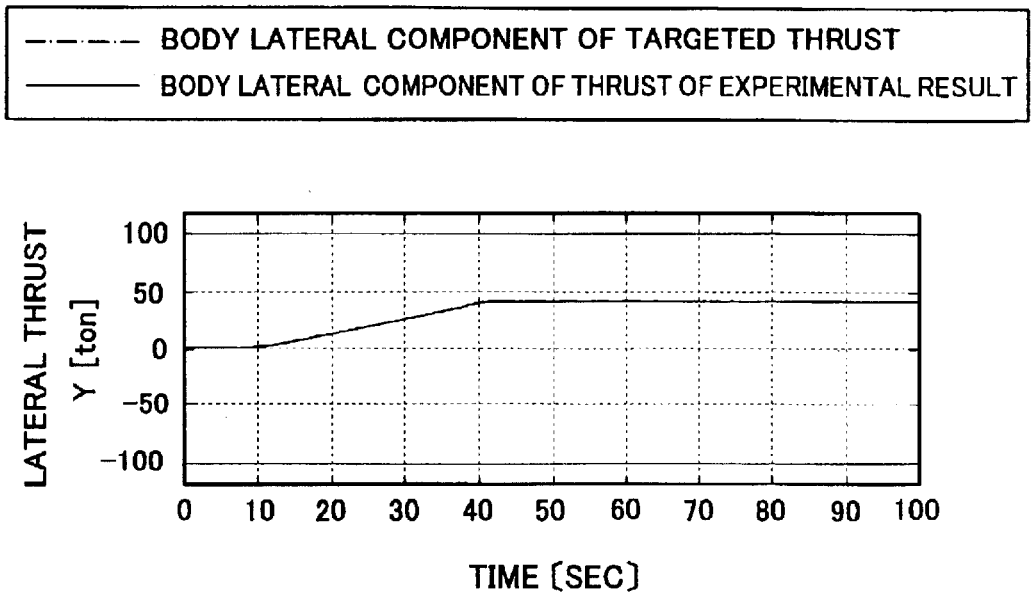
FIG. 33 is a graph showing time-series change in a lateral component of the thrust of the entire ship in the experiment 2.
Figure 34:
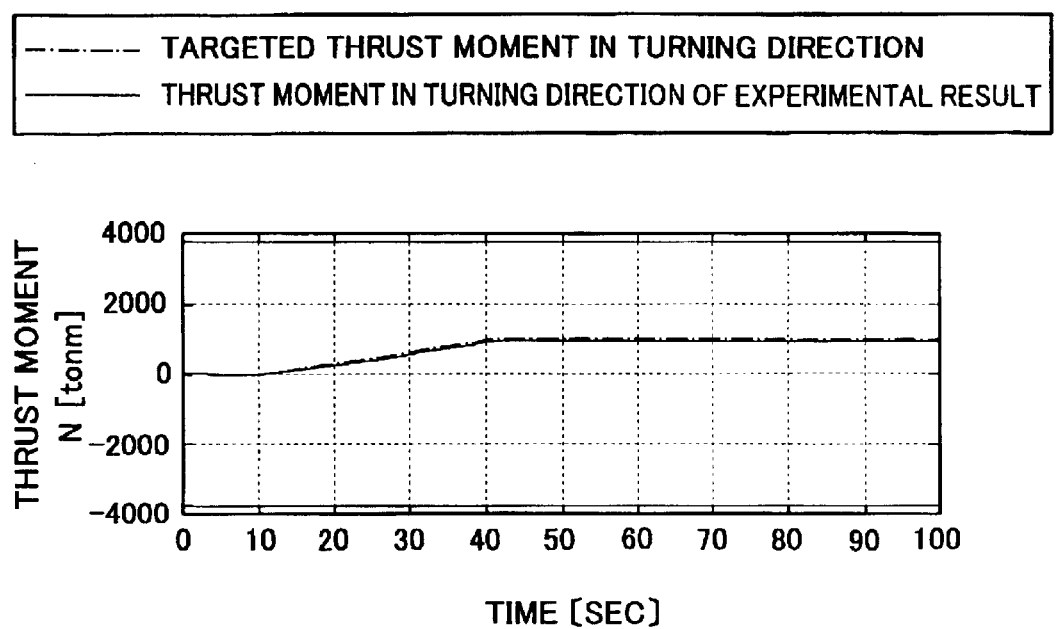
FIG. 34 is a graph showing time-series change in a thrust moment in the turning direction of the entire ship in the experiment 2.

FIG. 27 is a schematic plan view showing results of the experiment 2. FIGS. 28 to 34 are graphs showing the results of the experiment 2. FIG. 28 shows time-series change in change speeds of the propeller thrusts of the thrust generators 102 to 106, FIG. 29 shows time-series change in the propeller thrusts of the thrust generators 102 to 106, FIG. 30 shows time-series change in the turning speeds of the thrust generators 102 to 106, FIG. 31 shows time-series change in the turning speeds of the thrust generators 102 to 106, FIG. 32 shows time-series change in the longitudinal component of the thrust of the entire ship 110, FIG. 33 shows time-series change in the lateral component of the thrust of the entire ship 110, and FIG. 34 shows time-series change in the turning thrust (thrust moment in the turning direction) of the entire ship 110.

As shown in FIGS. 28 to 31, change speeds of the propeller thrusts, propeller thrusts, turning speeds, and turning angles of the thrust generators 102 to 106 change more greatly than the results of the experiment 1 from 10 seconds after start of the simulation until 40 seconds after start of the simulation, and are thereafter substantially stable. After 40 seconds after start of the simulation, the thrusts generated by the thrust generators 102 to 106 become larger than those of the experiment 1 to compensate for the thrust of the stopped thrust generator 101.

As can be seen from FIGS. 32 to 34, the longitudinal component and lateral component of the thrust in the entire ship 110 and the thrust moment in the turning direction of the ship 10 substantially coincide with those of the experiment 1. From this, the use of the thrust allocation algorithm according to the second embodiment allows appropriate thrust allocation to continue even when failure has occurred in the thrust generator.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A device for allocating thrusts in air and water craft equipped with a plurality of thrust generators that generate thrusts corresponding to manipulated variables, the device being configured to calculate the manipulated variables given to the plurality of thrust generators to allow the air and water craft to run with a given targeted thrust or to be held at a fixed point, comprising:

a calculating means for calculating the manipulated variables of the thrust generators that satisfy balance between the manipulated variables and the targeted thrust and a predetermined condition of a predetermined performance index, based on force balance and moment balance between the thrusts generated by the thrust generators and a thrust of the air and water craft, which is predetermined based on non-linear characteristics of the thrust generators, and based on the predetermined performance index associated with state variables relating to states of the thrust generators and/or the thrusts generated by the thrust generators, for minimizing the thrusts generated by the thrust generators, wherein the balance is given by formulae (1) to (3):

$$\sum_{i=1}^{n} f_{xi} = X \quad (1)$$

$$\sum_{i=1}^{n} f_{yi} = Y \quad (2)$$

$$\sum_{i=1}^{n} (k_{1i}f_{xi} + k_{2i}f_{yi}) = N \quad (3)$$

where

X is a longitudinal component of the thrust of the air and water craft,

Y is a lateral component of the thrust of the air and water craft,

N is a thrust moment in a turning direction of the air and water craft, $f_{xi}$ is a longitudinal component of the thrust generated by an i-th thrust generator, $f_{yi}$ is a lateral component of the thrust generated by the i-th thrust generator, $k_{1i}$ and $k_{2i}$ are coefficients, and i is 1 to n (n: natural number); and wherein the thrusts $F(t) = [f_{x1} \ldots f_{xn} f_{y1} \ldots f_{yn}]^T$ generated by the thrust generators are given by a non-linear equation (4)

$$F(t) = h[x(t), u(t), t] \quad (4)$$

when the manipulated variables of the thrust generators are represented by $u(t) = [u_1 \ldots u_m]^T$ (m: positive integer) of the thrust generators, where t is time variable, and x are state variables given by non-linear differential equations (5):

$$\dot{x}(t) = g[x(t), u(t), t] \quad (5).$$

2. The device according to claim 1, wherein the balance is predetermined based on the non-linear characteristics and dynamic characteristics of the thrust generators.

3. The device for allocating thrusts of claim 2, wherein the craft is selected from the group consisting of a watercraft and an aircraft.

4. The device according to claim 1, wherein the manipulated variables u satisfy relationship represented by a formula (6):

$$|u_j(t)| < u_j\text{max} \quad (6)$$

where $u_{jmax}$ is a constant, and j is 1 to m (m: natural number).

5. The device for allocating thrusts of claim 4, wherein the craft is selected from the group consisting of a watercraft and an aircraft.

6. The device for allocating thrusts of claim 4, wherein the craft is a watercraft.

7. The device according to claim 1, wherein the state variables x satisfy relationship represented by a formula (7)

$$|x_i(t)| < x_i\text{max} \quad (7)$$

where
X$_{imax}$ is a constant.

8. The device for allocating thrusts of claim 7, wherein the craft is selected from the group consisting of a watercraft and an aircraft.

9. The device according to claim 1, wherein the thrust generators are azimuth thrusters and the balance is given by formulae (8) to (10)

$$\sum_{i=1}^{n} T_i \cos\theta_i = X \quad (8)$$

$$\sum_{i=1}^{n} T_i \sin\theta_i = Y \quad (9)$$

$$\sum_{i=1}^{n} T_i(-yo_i \cos\theta_i + xo_i \sin\theta_i) = N \quad (10)$$

where
$T_i$ is a propeller thrust of an i-th thrust generator,
$\theta_i$ is a turning angle of the i-th thrust generator,
$xo_i$ is a position of the i-th thrust generator that is relative to a center of gravity of the air and water craft in a longitudinal direction of the craft, and
$yo_i$ is a position of the i-th thrust generator that is relative to the center of gravity of the air and water craft in a lateral direction of the craft.

10. The device for allocating thrusts of claim 9, wherein the craft is selected from the group consisting of a watercraft and an aircraft.

11. The device according to claim 1, wherein the performance index J is given by a formula (11)

$$J = \phi[x(t+T)] + \int_{t}^{t+T} L[x(t'), u(t')]dt' \quad (11)$$

where
$\Phi$ and L are scalar value functions differentiable up to a predetermined order or more,
T is a constant, and
t' is a variable that satisfies t≦t'≦t+T, and
the predetermined condition is given to minimize or maximize the value of the performance index J.

12. The device according to claim 11, wherein the performance index J includes weighting factors relating to the state variables x and/or the manipulated variables u, further comprising:
a changing means capable of changing the weighting factors on line.

13. The device according to claim 12, further comprising:
a detecting means for detecting occurrence of failure in the thrust generator, wherein
when the detecting means detects occurrence of the failure in the thrust generator, the changing means changes the weighting factor relating to the state variables x and/or the manipulated variables u of the thrust generator in which the failure occurs.

14. The device for allocating thrusts of claim 12, wherein the craft is selected from the group consisting of a watercraft and an aircraft.

15. The device for allocating thrusts of claim 11, wherein the craft is selected from the group consisting of a watercraft and an aircraft.

16. The device for allocating thrusts of claim 1, wherein the craft is a watercraft.

17. The device for allocating thrusts of claim 1, wherein the craft is an aircraft.

18. The device for allocating thrusts of claim 1, wherein the craft is selected from the group consisting of a watercraft and an aircraft.

* * * * *

UNITED STATES PATENT AND TRADEMARK OFFICE
CERTIFICATE OF CORRECTION

| | | |
|---|---|---|
| PATENT NO. | : 6,941,195 B2 | |
| APPLICATION NO. | : 10/440759 | |
| DATED | : September 6, 2005 | |
| INVENTOR(S) | : Masanori Hamamatsu et al. | |

It is certified that error appears in the above-identified patent and that said Letters Patent is hereby corrected as shown below:

Column 25, line 49, "in air and water craft" should be --in a craft--.

Column 25, line 53-54, "the air and water craft" should be --the craft--.

Column 25, line 63, "the air and water craft" should be --the craft--.

Column 26, lines 18-19, "the air and water craft" should be --the craft--.

Column 26, lines 20-21, "the air and water craft" should be --the craft--.

Column 26, lines 22-23, "the air and water craft" should be --the craft--.

Column 26, line 53, "satisfy relationship" should be --satisfy the relationship--.

Column 26, line 66, "satisfy relationship" should be --satisfy the relationship--.

Column 27, line 28, "the air and water craft" should be --the craft--.

Column 27, line 31, "the air and water craft" should be --the craft--.

Signed and Sealed this

Seventeenth Day of April, 2007

JON W. DUDAS
*Director of the United States Patent and Trademark Office*